(12) United States Patent
Miyazaki et al.

(10) Patent No.: US 9,836,521 B2
(45) Date of Patent: Dec. 5, 2017

(54) DEVICE CLASSIFICATION METHOD, DEVICE CLASSIFICATION SYSTEM, AND DEVICE

(71) Applicant: Panasonic Corporation, Osaka (JP)

(72) Inventors: Ryota Miyazaki, Osaka (JP); Toshihisa Nakano, Osaka (JP); Masao Nonaka, Osaka (JP); Motoji Ohmori, Osaka (JP); Masayuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 335 days.

(21) Appl. No.: 14/365,298

(22) PCT Filed: Sep. 20, 2013

(86) PCT No.: PCT/JP2013/005585
§ 371 (c)(1),
(2) Date: Jun. 13, 2014

(87) PCT Pub. No.: WO2014/050058
PCT Pub. Date: Apr. 3, 2014

(65) Prior Publication Data
US 2014/0330833 A1 Nov. 6, 2014

Related U.S. Application Data

(60) Provisional application No. 61/707,041, filed on Sep. 28, 2012.

(51) Int. Cl.
*G06F 17/30* (2006.01)
*H04L 29/08* (2006.01)
(Continued)

(52) U.S. Cl.
CPC ...... *G06F 17/30598* (2013.01); *H04L 12/282* (2013.01); *H04L 12/283* (2013.01);
(Continued)

(58) Field of Classification Search
None
See application file for complete search history.

(56) References Cited

U.S. PATENT DOCUMENTS 6,901,439 B1 * 5/2005 Bonasia .............. H04L 12/2809
709/220
8,423,893 B2 * 4/2013 Ramsay ................ G06F 3/0486
715/716

(Continued)

FOREIGN PATENT DOCUMENTS

JP 2002-85886 3/2002
JP 2006-74478 3/2006
(Continued)

OTHER PUBLICATIONS

International Search Report dated Dec. 10, 2013 in International (PCT) Application No. PCT/JP2013/005585.
(Continued)

*Primary Examiner* — Anh Tai Tran
(74) *Attorney, Agent, or Firm* — Wenderoth, Lind & Ponack, L.L.P.

(57) ABSTRACT

A device classification method that includes: receiving a first action performed on a first device in the device group, for classifying the first device as belonging to the coordinated operation group; setting, when the first action is received, each of one or more devices in the device group other than the first device to a classifiable state in which the device is classifiable as belonging to the coordinated operation group; receiving a second action performed on a second device in the device group that is set to the classifiable state, for (Continued)

classifying the second device as belonging to the coordinated operation group; and classifying, when the second action is received, the first device and the second device as belonging to the coordinated operation group.

16 Claims, 34 Drawing Sheets

(51) Int. Cl.
    *H04L 12/28*     (2006.01)
    *H04L 12/24*     (2006.01)
    *H04L 12/26*     (2006.01)
    *H04L 29/12*     (2006.01)

(52) U.S. Cl.
    CPC .......... *H04L 67/10* (2013.01); *H04L 41/0853* (2013.01); *H04L 43/0817* (2013.01); *H04L 61/2007* (2013.01); *H04L 2012/285* (2013.01)

(56) References Cited

U.S. PATENT DOCUMENTS

2006/0046654 A1* 3/2006 Shiozawa ............... H04W 4/08
    455/41.2
2006/0140404 A1* 6/2006 Oyama ................. H04B 1/202
    380/201
2006/0250979 A1* 11/2006 Gauweiler ........ H04L 29/12254
    370/254
2010/0180019 A1* 7/2010 Elston, III .......... H04L 12/2809
    709/222
2010/0299639 A1 11/2010 Ramsay et al.

FOREIGN PATENT DOCUMENTS

JP     2007-53639     3/2007
JP     2008-181319     8/2008
JP     2010-226664     10/2010

OTHER PUBLICATIONS

Office Action dated Mar. 22, 2017 in corresponding Taiwanese Application No. 102134277, with English Translation of Search Report.

* cited by examiner

FIG.14

Device management information 1400

| Device ID | Product code | IP address | Group ID | Coordinated operation group ID |
|---|---|---|---|---|
| 000001 | A1-11-11-11 | 111.111.111 | 001 | 001A |
| 000002 | B2-22-22-22 | 222.222.222 | 002 | 002A,002E |
| 000003 | C3-33-33-33 | 111.111.111 | 001 | - |
| ⋮ | ⋮ | ⋮ | ⋮ | ⋮ |

FIG.15

Coordinated operation database 1500

| Coordinated operation ID 1510 | Processing order 1520 | Device type 1530 | Trigger flag 1540 | Device type code 1550 | Transmission command 1560 |
|---|---|---|---|---|---|
| 001 | 1.Activate air-conditioner<br>2.Activate air purifier | Air conditioner | 1 | A1,A3,A4 | abcdef |
|  |  |  |  |  | abcfed |
|  |  | Air purifier | 0 | A2 | ghijkl |
| 002 | 1.Activate television<br>2.Set lighting to predetermined level | Television | 1 | C1,C2,C3 | mnopqr |
|  |  |  |  |  | mnorqp |
|  |  | Lighting | 0 | C1,C2,C3 | stuvwx |
| 003 | 1.Activate trigger devices<br>2.Take measurements using trigger devices<br>3.Activate television<br>4.Display measurement results on television | Body composition monitor | 1 | B2,B3,B4 | adgjmp |
|  |  | Blood pressure meter | 1 | K5,K6 | behknq |
|  |  | Activity monitor | 1 | K5,K6 | cfilor |
|  |  | Television | 0 | T1,T2,T3 | defghi |
|  |  |  |  | T4,T5 | defihg |
| ... | ... | ... | ... | ... | ... |

FIG.16

Coordinated operation group information 1600

| Coordinated operation group ID 1610 | Processing order 1620 | Device type 1630 | Trigger flag 1640 | Transmission command 1660 | Device ID 1670 |
|---|---|---|---|---|---|
| 001A | 1.Activate air-conditioner 2.Activate air purifier | Air conditioner | 1 | abcdef | 0001 |
| | | Air purifier | 0 | ghijkl | 0022 |
| 001C | 1.Activate television 2.Set lighting to predetermined level | Television | 1 | mnopqr | 0051 |
| | | Lighting | 0 | stuvwx | 0102 |
| ... | ... | ... | ... | ... | ... |

FIG.25

Coordinated operation database 2500

| Coordinated operation ID (1510) | Processing order (1520) | Terminal type (1530) | Trigger flag (1540) | Corresponding product code (1550) | Transmission command (1560) | Limiting condition (2570) |
|---|---|---|---|---|---|---|
| 001 | 1.Activate air-conditioner<br>2.Activate air purifier | Air-conditioner | 1 | A1,A3,A4 | abcdef | — |
|  |  | Air purifier | 0 | A2 | abcfed | — |
| 002 | 1.Activate television<br>2.Set lighting to predetermined level | Television | 1 | C1,C2,C3 | ghijkl | — |
|  |  |  |  | T1,T2,T3 | mnopqr | — |
|  |  | Lighting | 0 | T4,T5 | mnorqp | Television is positioned within ±30 degrees |
|  |  |  |  | C1,C2,C3 | stuvwx | — |
| 003 | 1.Activate trigger devices<br>2.Take measurements using trigger devices<br>3.Activate television,<br>4.Display measurement results on television | Body composition monitor | 1 | B2,B3,B4 | adgjmp | — |
|  |  | Blood pressure meter | 1 | K5,K6 | behknq | — |
|  |  | Activity monitor | 1 | K5,K6 | cfilor | — |
|  |  | Television | 0 | T1,T2,T3 | defghi | — |
|  |  |  |  | T4,T5 | defihg | — |
| … | … | … | … | … | … | … |

FIG.30

Operation management information 3000

| Time | Device ID | IP address | Operation |
|---|---|---|---|
| 2013/08/01 12:21:15 | 000001 | 888.888.888 | Power on |
| 2013/08/01 12:20:45 | 000101 | 222.222.222 | Coordination button press |
| ⋮ | ⋮ | ⋮ | ⋮ |
| 2013/07/29 22:12:31 | 000001 | 111.111.111 | XYZ |
| ⋮ | ⋮ | ⋮ | ⋮ |

Device management information 3400

| Device ID 1410 | Product code 1420 | IP address 1430 | Device direction 3410 | Device relative coordinates 3420 | Group ID 1440 | Coordinated operation group ID 1450 |
|---|---|---|---|---|---|---|
| 000001 | A1-11-11-11 | 111.111.111 | Upper right | (0,0,0) | 001 | 001A |
| 000002 | B2-22-22-22 | 222.222.222 | – | – | 002 | 002A,002E |
| 000003 | C3-33-33-33 | 111.111.111 | Left | (0,1,1) | 001 | 001A |
| ... | ... | ... | ... | ... | ... | ... |

DEVICE CLASSIFICATION METHOD, DEVICE CLASSIFICATION SYSTEM, AND DEVICE

This application claims benefit to the U.S. Provisional Application No. 61/707,041, filed on Sep. 28, 2012.

TECHNICAL FIELD

The present invention is related to device classification methods that classify devices, device classification systems that classify devices, and devices subject to classification.

BACKGROUND ART

A system of a server device and devices installed in a house, etc., communicating via a communication network such as the internet is conventionally known (for example, refer to cited document 1).

The server device in such a system may make each device that is classified as belonging to a coordinated operation group operate in coordination with other devices in the coordinated operation group by transmitting to the device a control command that causes the device to operate in coordination with the other devices. In such a system, each device that the server is able to communicate with may be classified as belonging to a coordinated operation group.

In such a system, devices that are to be operated in coordination must be classified in advance as belonging to a coordinated operation group.

CITATION LIST

Patent Literature

Patent Literature 1: Japanese Patent Application Publication No. 2002-85886

SUMMARY OF INVENTION

Technical Problem

As described above, classifying devices as belonging to the coordinated operation group is required before coordinated operation of the devices is performed. Typically, from the perspective of a user of the system described above, it is desirable that the classification of devices as belonging to the coordinated operation group be realized by a simple method.

Accordingly, the present invention aims to provide a device classification method that can simply classify devices that are to be operated in coordination as belonging to the coordinated operation group

Solution to Problem

To solve the above problem, the device classification method pertaining to the present invention is a device classification method of a device classification system that classifies devices in a device group composed of a plurality of devices associated with each other as belonging to a coordinated operation group, devices classified as belonging to the coordinated operation group operating in coordination with each other, the device classification method comprising: receiving a first action performed on a first device in the device group, for classifying the first device as belonging to the coordinated operation group; setting, when the first action is received, each of one or more devices in the device group other than the first device to a classifiable state in which the device is classifiable as belonging to the coordinated operation group; receiving a second action performed on a second device in the device group that is set to the classifiable state, for classifying the second device as belonging to the coordinated operation group; and classifying, when the second action is received, the first device and the second device as belonging to the coordinated operation group.

Summary of Invention

According to the above-described device classification method pertaining to the present invention, when a user intends to cause coordinated operation of the first device and the second device, the user is able to easily classify the first device and the second device to the same coordinated operation group by simply performing actions on only the first device and the second device.

BRIEF DESCRIPTION OF DRAWINGS

FIG. 14 shows a data structure of device management information 1400.

FIG. 15 shows a data structure of a coordinated operation database 1500.

FIG. 16 shows a data structure of coordinated operation group information

FIG. 25 shows a data structure of a coordinated operation database 2500.

FIG. 30 shows a data structure of operation management information 3000.

FIG. 34 shows a data structure of device management information 3400.

DETAILED DESCRIPTION

<Embodiment 1>
1.1 Structure of Terminal Control System

Figure 1:
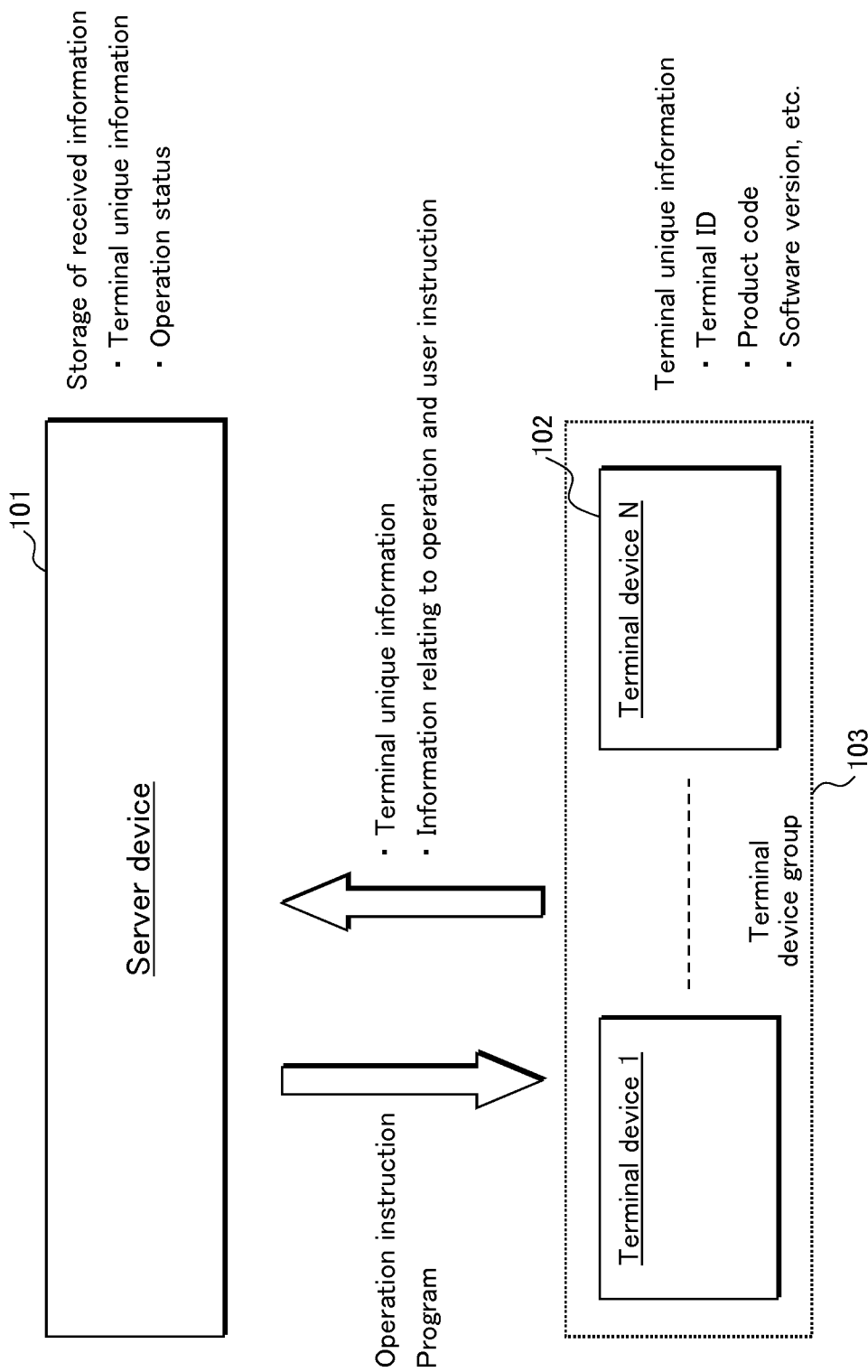
FIG. 1 shows a system structure according to Embodiment 1.

As shown in FIG. 1, a terminal control system includes a server device 101 and a plurality of terminal devices 102 constituting a terminal device group 103.

The terminal device group 103 is composed of the terminal devices 102 that operate in coordination with each other. For example, the terminal devices 102 in the terminal device group 103 are provided in the same home. Alternatively, at least one of the terminal devices 102 in the terminal device group 103 my be used both inside and outside the home. Each of the terminal devices 102 in the terminal device group 103 may be used by the same person or any person in a group of at least two people such as a family. The same home mentioned above may be a home of one person or a home of one family. The same home mentioned above is not necessarily a private home. For example, the same home may be a shop, a company, or an office space used by an organization, or the like.

The terminal devices 102 are either electric household appliances provided in the home or portable information terminals used both inside and outside the home. Examples of the terminal devices 102 include a television receiver, an air conditioner, a washing machine, an induction heating (IH) cooking heater, a microwave, and a mobile telephone.

The server device 101 manages the terminal devices 102 as the terminal device group 103. The server device 101 gathers information from each of the terminal devices 102 in the terminal device group 103, and determines the operation of at least one of the terminal devices 102 according to an operation status acquired from another one of the terminal devices 102. This realizes coordination of the terminal devices 102 in the terminal device group 103.

1.2 Structure of Server Device 101

The following describes the structure of the server device 101 in detail.

The server device 101 is a computer composed of a microprocessor, a RAM, a ROM, a hard disk, and so on. The functional blocks of the server device 101 described below are realized by the microprocessor executing computer programs stored in the RAM, the ROM, and the hard disk.

Figure 2:
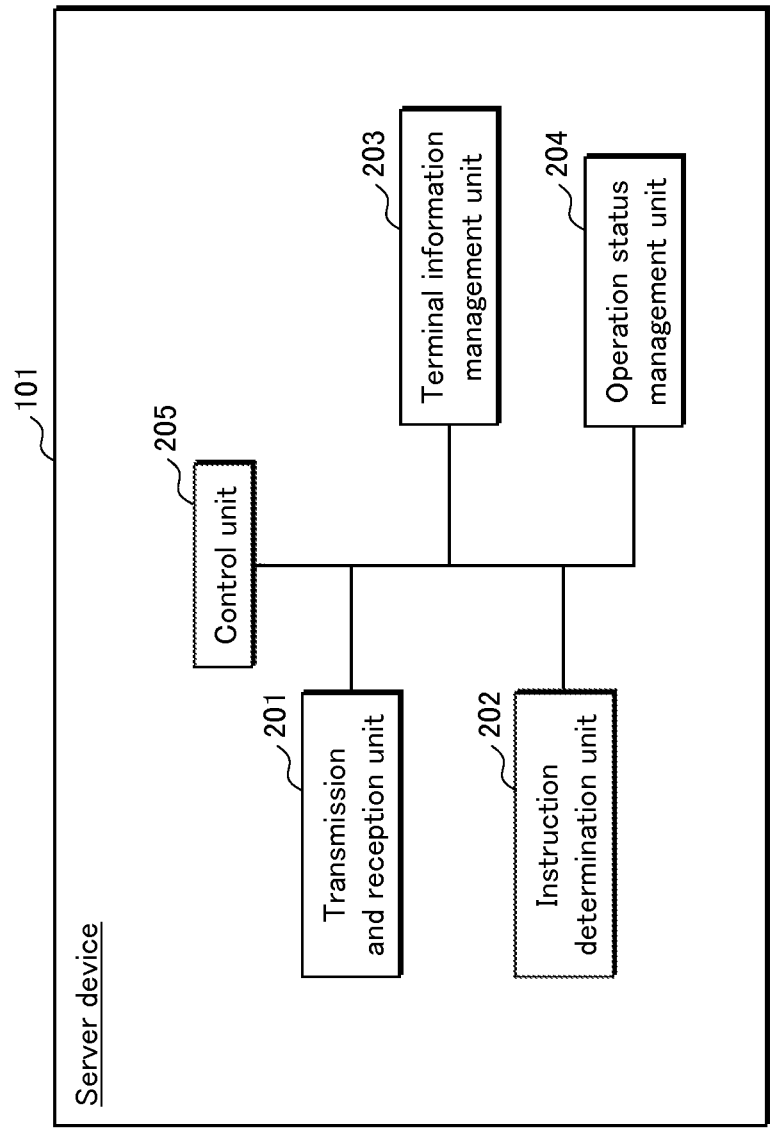
FIG. 2 shows the structure of a server device according to Embodiment 1.

As shown in FIG. 2, the server device 101 includes, as function blocks, a transmission and reception unit 201, an instruction determination unit 202, a terminal information management unit 203, an operation status management unit 204, and a control unit 205.

(1) Transmission and Reception Unit 201

The transmission and reception unit 201 is a communication unit for communicating with the terminal devices 102 via a network by using wireless or cable, and has a gigabit Ethernet (GbE) interface, for example. The transmission and reception unit 201 receives terminal unique information and an operation status from each of the terminal devices 102. The terminal unique information includes a terminal ID uniquely identifying the terminal device 102, a product code indicating the type of the terminal device 102, and a software version indicating the version of an internal program such as firmware or middleware. The operation status is either information relating to a user operation instruction received by the terminal device 102 or information relating to an operation of the terminal device 102. For example, the information relating to an operation of the terminal device 102 relates to an operation performed by the terminal device 102 according to a user operation, such as the power being switched on, a door being opened, a warming function being used, etc., or an operation performed by the terminal device 102 for causing a change in status.

Also, the transmission and reception unit 201 transmits an instruction to any of the terminal devices 102. Specifically, the transmission and reception unit 201 transmits, to the terminal device 102, an operation instruction indicating that the power is to be switched on, the power-off timer is to be set, the temperature is to be adjusted, etc. Also, the transmission and reception unit 201 transmits, to any of the terminal devices 102, a program for adding a new function or correcting malfunctions. Instead of a program, the transmission and reception unit 201 may transmit an installer for installing the program, or alternatively, may transmit a downloader for acquiring the program or a uniform resource identifier (URI) indicating the location of the program.

(2) Terminal Information Management Unit 203

The terminal information management unit 203 has a non-volatile recording medium such as a flash memory or a hard disk drive. The terminal information management unit 203 receives the terminal unique information of each terminal device 102 via the transmission and reception unit 201, and stores and manages the terminal unique information as a database. Also, the terminal information management unit 203 updates the database with use of the terminal unique information thus received.

(3) Operation Status Management Unit 204

The operation status management unit 204 has a non-volatile recording medium such as a flash memory or a hard disk drive. The operation status management unit 204 receives an operation status from each of the terminal devices 102 via, the transmission and reception unit 201, and stores and manages the operation status as a database. Also, the operation status management unit 204 updates the database with use of the received operation status.

(4) Instruction Determination Unit 202

The instruction determination unit 202 determines an instruction to be transmitted to any of the terminal devices 102 in the terminal device group 103. Specifically, the determination is performed based on (i) either or both of the terminal unique information and the operation status received via the transmission and reception unit 201 and (ii) either or both of the database managed by the terminal information management unit 203 and the database managed by the operation status management unit 204. The instruction determination unit 202 transmits the instruction thus determined to the terminal device 102 via the transmission and reception unit 201. Note that operation instructions and programs to be transmitted are managed by being stored in a storage unit (not illustrated). Specifically, the storage unit stores code converted from instructions so as to be receivable and executable by the terminal devices 102. Such instructions include an instruction indicating that the power of an air conditioner is to be switched off and an instruction indicating that the brightness setting of a lighting device is to be "dark". Alternatively, the storage unit stores a program for installing firmware, a URI indicating the location of firmware, etc.

(5) Control Unit 205

The control unit 205 manages and controls the transmission and reception unit 201, the terminal information management unit 203, the operation status management unit 204, and the instruction determination unit 202 as described above, and thereby realizes the functions of the server device 101.

1.3 Structure of Terminal Devices 102

Figure 3:
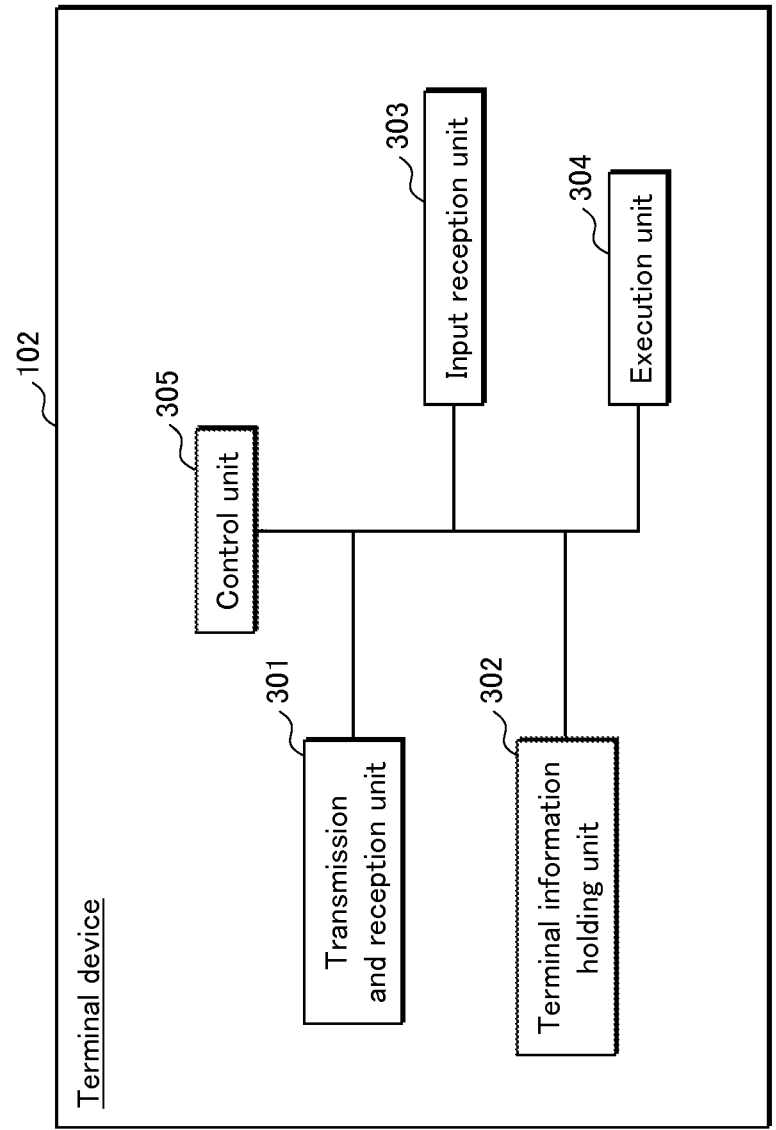
FIG. 3 shows the structure of a terminal device according to Embodiment 1.

The following describes in detail the structure of the terminal devices 102. As shown in FIG. 3, each of the terminal devices 102 includes, as function blocks, a transmission and reception unit 301, a terminal information holding unit 302, an input reception unit 303, an execution unit 304, and a control unit 305.

(1) Transmission and Reception Unit 301

The transmission and reception unit 301 is a communication unit for communicating with the server device 101 via a network by using wireless or cable, and has a gigabit Ethernet (GU) interface, for example.

The transmission and reception unit 301 transmits, to the server device 101, an operation status and the terminal unique information held in the terminal information holding unit 302. Also, the transmission and reception unit 301 receives an operation instruction, a program, etc., from the server device 101.

(2) Terminal Information Holding Unit 302

The terminal information holding unit 302 has a nonvolatile recording medium such as a flash memory, and holds the terminal unique information of the terminal device 102 that includes a terminal ID uniquely identifying the terminal device 102, a product code indicating the type of the terminal device 102, and a software version indicating the version of an internal program such as firmware or middleware.

(3) Input Reception Unit 303

The input reception unit 303 includes a button, a touch panel, a remote control, or similar. The input reception unit 303 receives the input of an operation instruction from a user.

(4) Execution Unit 304

The execution unit 304 is a function unit for realizing the individual functions of the terminal device 102. The execution unit 304 performs an operation based on an instruction received via the transmission and reception unit 301. If the instruction is an operation instruction, the execution unit 304 performs an operation based on the operation instruction. If the instruction is a program, the execution unit 304 performs an operation such as installation or update of the received program.

Also, the execution unit 304 performs an operation based on a user operation instruction received by the input reception unit 303.

(5) Control Unit 305

The control unit 305 includes a microprocessor and a memory, and controls the overall operations of the terminal device 102. The functions of the control unit 305 are realized by the microprocessor performing a computer program stored in the memory.

1.4 Operation of Terminal Control System

Figure 4:
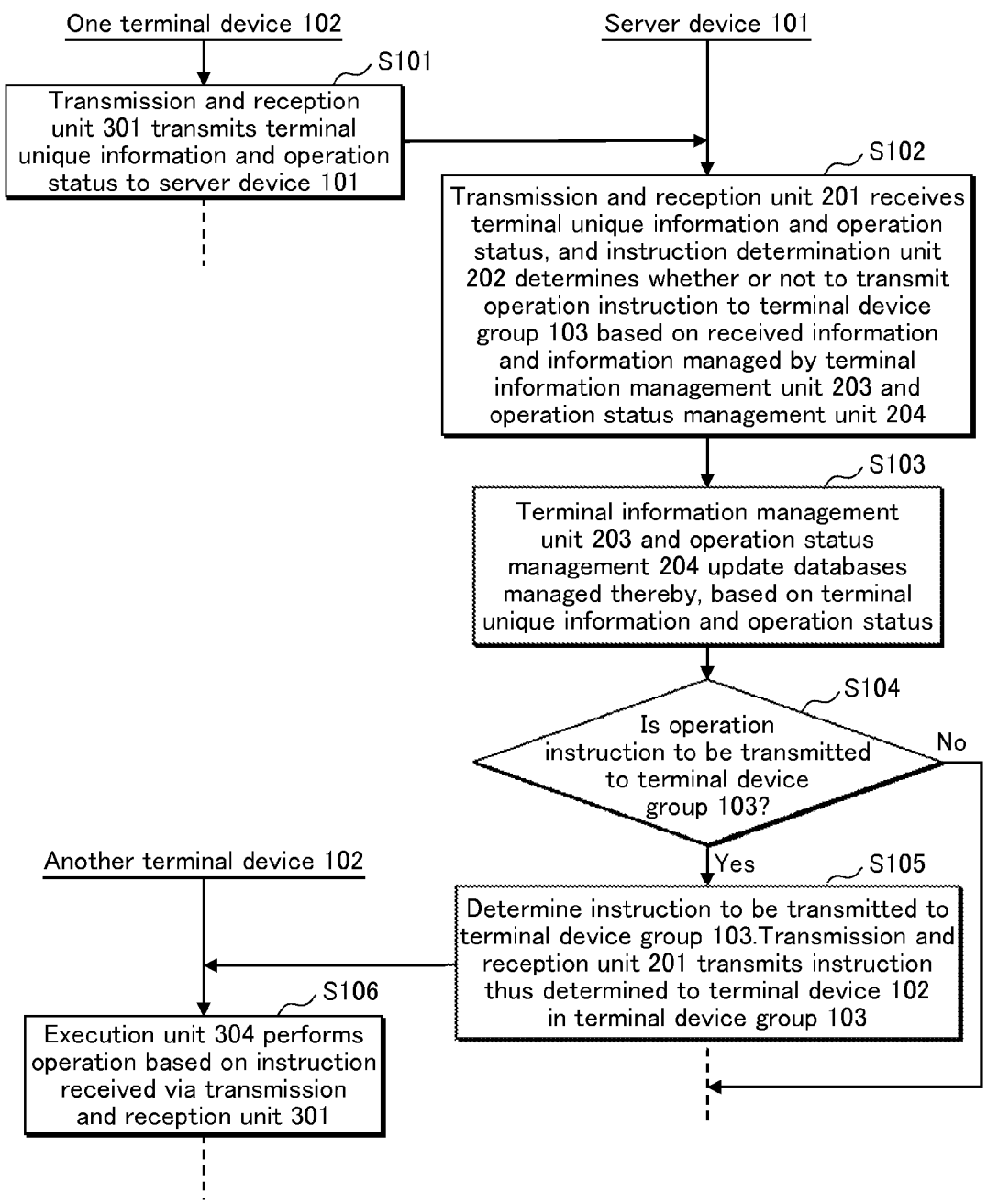
FIG. 4 is a flowchart showing an instruction transmission operation according to Embodiment 1.

The following describes an example of an operation of the server device 101 controlling the terminal devices 102, with reference to FIG. 4.

One of the terminal devices 102 transmits, to the server device 101 via the transmission and reception unit 301, the terminal unique information held in the terminal information holding unit 302 and the operation status relating to the operation performed by the execution unit 304 (step S101).

The transmission and reception unit 201 of the server device 101 receives the terminal unique information and the operation status from the terminal device 102 via the transmission and reception unit 201, and the instruction determination unit 202 determines whether or not to instruct the terminal device group 103 to operate, based on the terminal unique information and the operation status thus received and the terminal unique information managed by the terminal information management unit 203 and the operation status managed by the operation status management unit 204 (step S102).

The terminal information management unit 203 of the server device 101 updates the database managed thereby, based on the terminal unique information received by the transmission and reception unit 201, and the operation status management unit 204 updates the database managed thereby, based on the operation status received by the transmission and reception unit 201 (step S103).

In step S102, when it is determined that the terminal device group 103 is instructed to operate ("Yes" at step S104), the instruction determination unit 202 determines at least one instruction to be transmitted to the terminal device group 103. The transmission and reception 201 of the server device 101 transmits the at least one instruction determined by the instruction determination unit 202 to the corresponding terminal devices 102 in the terminal device group 103 (step S105).

The terminal device 102 of the terminal device group 103 receives the instruction via the transmission and reception unit 301, and the execution unit 304 of the terminal device 102 performs an operation based on the received instruction (step S106).

Note that, in step S102, when it is not determined to instruct the terminal device group 103 to operate ("No" at step S104), the server device 101 does not perform step S105.

1.5 Summary

As described above, based on an operation performed by one of the terminal devices 102 in the terminal device group 103, or on a user instruction received by one of the terminal devices 102 in the terminal device group 103, a different one of the terminal devices 102 in the same terminal device group 103 is caused to perform a coordinated operation. Accordingly, with only a function of communicating with the server device 101, each of the terminal devices 102 can perform a coordinated operation without having a function of controlling the other terminal devices 102.

<Embodiment 2>
<Summary>

The following describes a device classification system as an embodiment of a device control method pertaining to the present invention. The device classification system classifies devices determined by a user, from among devices positioned in a house, as belonging to a coordinated operation group. Devices classified as belonging to the coordinated operation group operate in coordination with each other.

Each device that belongs to this device classification system has a coordination button that accepts a press action from the user, and a light emitting diode (LED) that switches on and off in a predetermined pattern (for example, in a one-second cycle).

In this device classification system, when the user wishes to classify devices as belonging to the coordinated operation group, first, the user performs a long press on the coordination button of one device (hereafter, "device A") among the devices to be classified as belonging to the coordinated operation group. In response to the long press on the coordination button, the LED of each device that belongs to the device classification system in the house of the user starts switching on and off in the predetermined pattern.

Next, while the LED of at least one other device to be classified as belonging to the coordinated operation group (hereafter, "additional device") is switching on and off, the user presses the coordination button of the additional device.

As a result, the device classification system classifies the device A and the additional device, whose coordination button was pressed during the period in which the LED was switching on and off, as belonging to the same coordinated operation group.

The following describes details of the device classification system, given with reference to the drawings.

<Structure>

Figure 5:
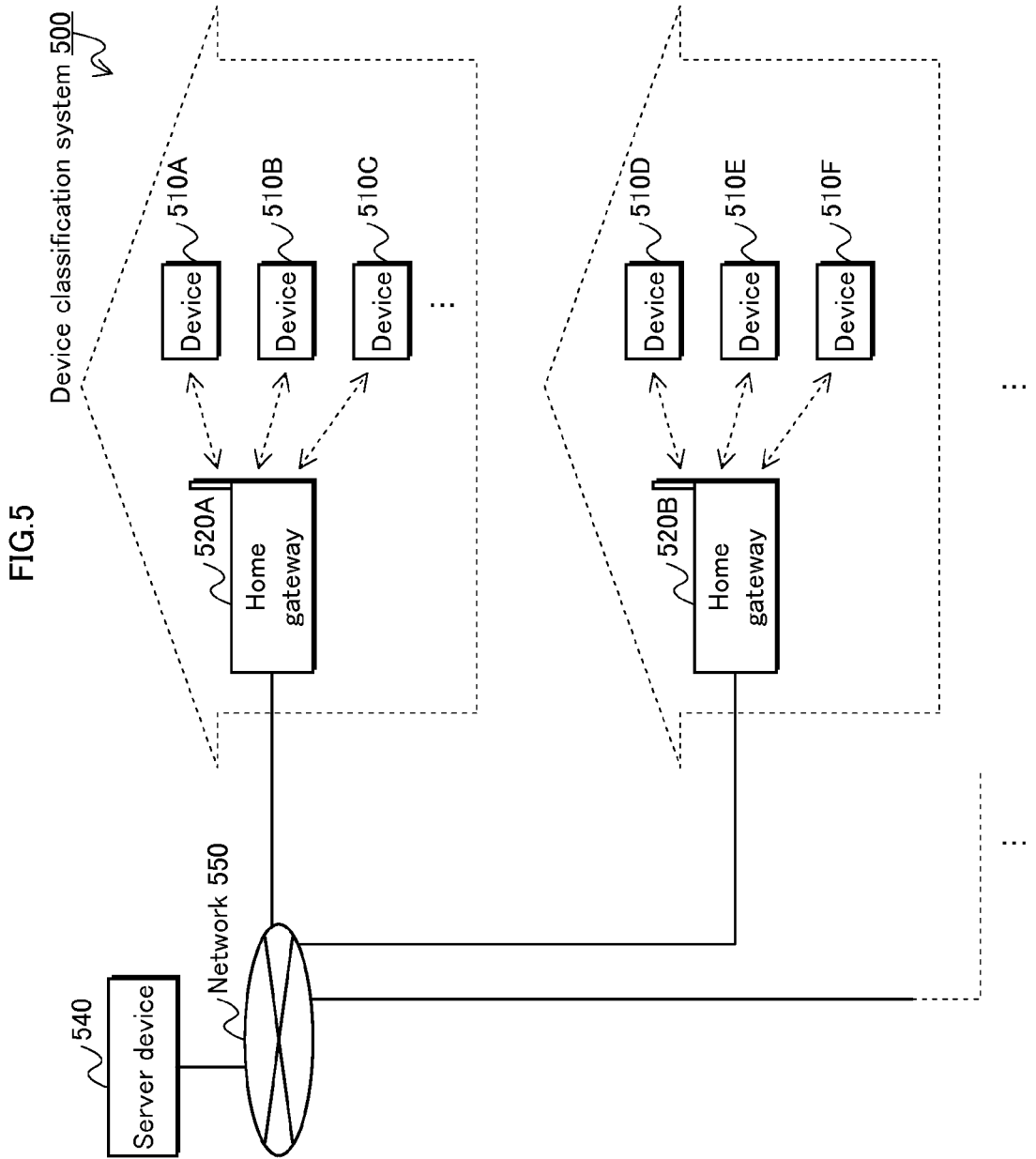
FIG. 5 shows a system structure of a device classification system 500.

FIG. 5 is a system structural diagram showing a structure of a device classification system 500.

As shown in FIG. 5, the device classification system 500 includes a plurality of a device 510 (devices 510A through 510F), a plurality of a home gateway 520 (home gateway 520A and 520B), a server device 540, and a network 550.

The following describes, in order, elements of the device classification system 500.

The devices 510A through 510F are each electrical devices installed in the house. For example, an air conditioner, an air purifier, a television, a refrigerator, a recorder, etc. Furthermore, the devices 510A through 510F are each able to communicate with the server device 540 via the home gateway 520 and the network 550.

The following does not describe each of the devices 51 OA through 510F separately; instead the devices 510A through 510F are described using the device 510 representing the devices 510A through 510F.

Figure 6:
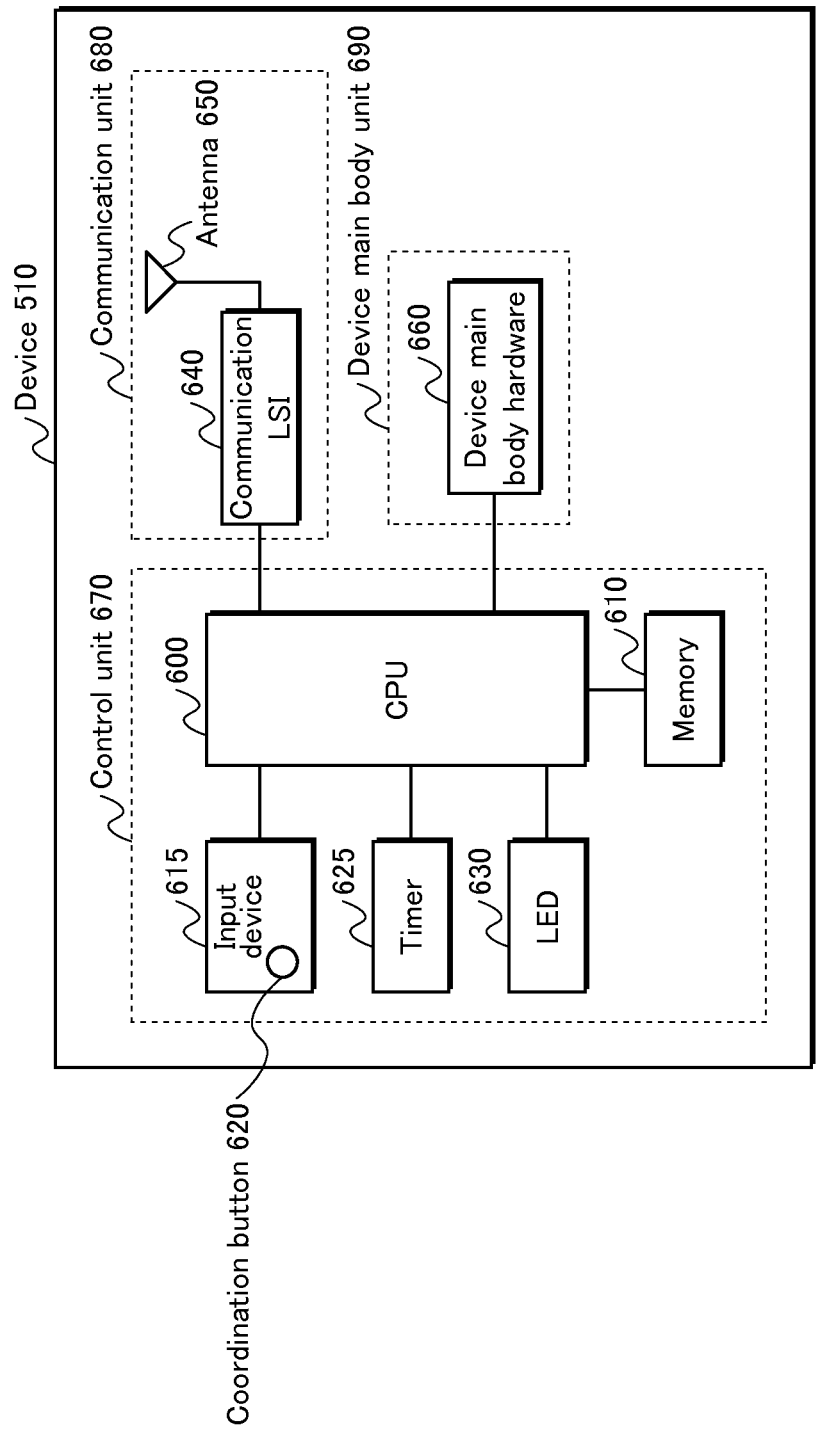
FIG. 6 is a circuit diagram of a device 510.

FIG. 6 is a circuit diagram of the device 510.

As shown in FIG. 6, the device 510 includes a control unit 670, communication unit 680, and a device main body unit 690.

The control unit 670 includes a central processing unit (CPU) 600, a memory 610, an input device 615, a timer 625, and an LED 630. The communication unit 680 includes a communication large scale integration (LSI) 640, and an antenna 650. The device main body unit 690 includes device main body hardware 660.

The device main body hardware 660 is connected to the CPU 600. The device main body hardware 600 is a hardware group for implementing a function of the device 510, which is an electrical device, by being controlled by the CPU 600. For example, assuming the device 510 is an air conditioner, the device main body hardware 660 is a hardware group composed of a compressor, about exchanger, a blowing fan, etc., for implementing functions of the air conditioner.

The antenna 650 is connected to the communication LSI 640 and is used for communication performed by the communication LSI 640. For example, the antenna 650 may be a metal monopole antenna.

The communication LSI 640 is connected to the antenna 650 and the CPU 600, and is controlled by the CPU 600. The communication LSI 640 has a modulation function of modulating transmission signals sent from the CPU 600, a transmission function of transmitting the modulated signals to the home gateway 520 by using the antenna 650, a reception function of receiving, by using the antenna 650, signals sent from the home gateway 520, and a demodulation function of demodulating and sending the signals received to the CPU 600.

Here, the communication between the communication LSI 640 and the home gateway 520 is, for example, performed in accordance with a Bluetooth standard.

The input device 615 is connected to the CPU 600. The input device 615 has a function of converting actions performed by the user of the device 510 into electric signals, and sending the electric signals to the CPU 600. The input device 615 may, for example, be implemented by a remote control that has a group of operation buttons, an operation panel, etc. In a case in which the input device 615 is implemented by including a remote control, the remote control and the device main body, for example, communicate by using wireless communication such as infrared communication, etc.

Further, the input device 615 has a coordination button 620 that receives press actions performed by the user.

The timer 625 is connected to the CPU 600, and is controlled by the CPU 600.

The LED 630 is connected to the CPU 600, and is controlled by the CPU 600.

The memory 610 is connected to the CPU 600, and includes random access memory (RAM), read only memory (ROM), and flash memory. The memory 610 stores a program that regulates operations of the CPU 600, and stores data used by the CPU 600.

The CPU 600 is connected to the memory 610, the input device 615, the timer 625, the LED 630, the communication LSI 640, and the device main body hardware 660. The CPU 600 has a function of causing the device 510 to implement the following three functions. The CPU 600 achieves this function by controlling the input, device 615, the timer 625, the LED 630, the communication LSI 640, and the device main body hardware 660, by executing the program stored in the memory 610.

Device control function: A function of causing the device 510 to implement functions equivalent to typical functions of the device, by controlling the device 510. For example, if the device 510 is a television, the functions include a program playback function, a channel change function, etc. if the device 510 is a washing machine, the functions include a rinse function, a drain function, etc.

Classification process implementation function A: A function of implementing, by controlling the device 510, a classification process of the device classification system 500 in conjunction with other elements forming the device classification system 500. This classification process is described in detail, using a flowchart, under the heading "Classification Process" later in this document.

Coordination process implementation function A: A function of implementing, by controlling the device 510, a coordination process of the device classification system 500 in conjunction with other elements forming the device classification system 500. This coordination process is described in detail, using a flowchart, under the heading "Coordination Process" later in this document.

Focussing on function, the structure of the device 510, which includes the circuit structure described above, is described below.

Figure 7:
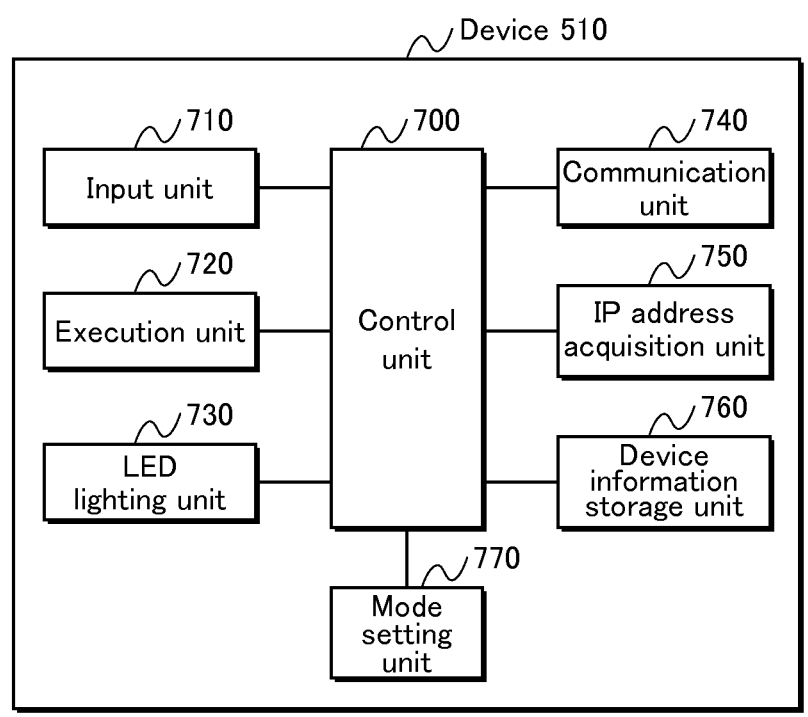
FIG. 7 is a block diagram showing function blocks of the device 510.

FIG. 7 is a block diagram showing function blocks of the device 510.

As shown in FIG. 7, the device 510 includes a control unit 700, an input unit 710, an execution unit 720, an LED lighting unit 730, a communication unit 740, an IP address acquisition unit 750, and a device information storage unit 760.

The input unit 710 is implemented by the CPU 600 executing a program, and the input device 615. The input unit 710 is controlled by the control unit 700. The input unit 710 has a function of receiving an action performed by the user of the device 510 on the input device 615. The input unit 710 also has a function of generating a command that indicates that the device main body hardware 660 is to be caused to perform a predetermined operation, and transmitting the instruction to the execution unit 720. The command is generated when an action is received from the user, and the action indicates that the device main body hardware 660 is to be caused to perform the predetermined operation.

The execution unit 720 is implemented by the CPU 600 executing a program, and the device main body hardware 660. The execution unit 720 is controlled by the control unit 700. When a command for causing the device main body hardware 660 to execute a predetermined operation is transmitted from the input unit 710 or the communication unit 740, the execution unit 720 has a function of executing the predetermined operation indicated by the command, by using the device main body hardware 660.

The LED lighting unit 730 is implemented by the CPU 600 executing a program, and the LED 630. The LED lighting unit 730 is controlled by the control unit 700. When a signal indicating that the LED 630 is to be lit in a predetermined pattern is transmitted from the control unit 700, the LED lighting unit 730 has a function of executing the operation of the predetermined pattern indicated by the signal, by using the LED 630.

The communication unit 740 is implemented by the CPU 600 executing a program, the communication LSI 640, and the antenna 650. The communication unit 740 is controlled by the control unit 700. The communication unit 740 has a function of communicating with the home gateway 520 according to the Bluetooth standard, and a function of communicating with the server device 540 via the home gateway 520 and the network 550.

Further, when the communication unit 740 receives a command transmitted from the server device 540, indicating that the device main body hardware 660 is to be caused to perform the predetermined operation, the communication unit 740 transmits the command to the execution unit 720. Furthermore, when the communication unit 740 receives a classification mode setting signal transmitted from the server device 540, indicating that an operation mode of the device 510 is to be set to a classification mode, the communication unit 740 transmits the classification mode setting signal to the mode setting unit 770.

The IP address acquisition unit 750 is implemented by the CPU 600 executing a program. The IP address acquisition unit 750 is controlled by the control unit 700. The IP address acquisition unit 750 has a function of acquiring, by using the communication unit 740, an IP address from the home gateway 520 that communicates with the communication unit 740. The IP address is assigned when the home gateway 520 is connected to the network 550.

The device information storage unit 760 is implemented by the CPU 600 executing a program, and a part of a memory area included in the memory 610. The device information storage unit 760 has a function of storing a product code of the device 510.

Here, the product code refers to information that includes device type information indicating a device type of the device 510, and includes identification information identifying the device 510. As one example, the product code may be composed of one alphabet character and seven digits. The alphabet character and the first digit indicate the device type of a device, and the next six digits indicate a manufacturing number of the device (i.e., an identifier that can be used to identify the device). An example of such a product code is the product code 1420 shown in FIG. 14, described later in this document.

The mode setting unit 770 is implemented by the CPU 600 executing a program, and the timer 625. The mode setting unit 770 is controlled by the control unit 700. The mode setting unit 770 has a function of setting the operation mode of the device 510 to either a normal mode or the classification mode. Here, the classification mode refers to an operation mode that sets the device 510 to a state in which the device 510 can be classified as belonging to the coordinated operation group. Also, the normal mode refers to an operation mode that is not the classification mode.

The control unit 700 is implemented by the CPU 600 executing a program. The control unit 700 has a function of causing the device 510 to implement the device control function, the classification process implementation function A, and the coordination process implementation function A, mentioned above, by controlling the input unit 710, the execution unit 720, the LED lighting unit 730, the communication unit 740, IP address acquisition unit 750, and the device information storage unit 760.

Figure 8:
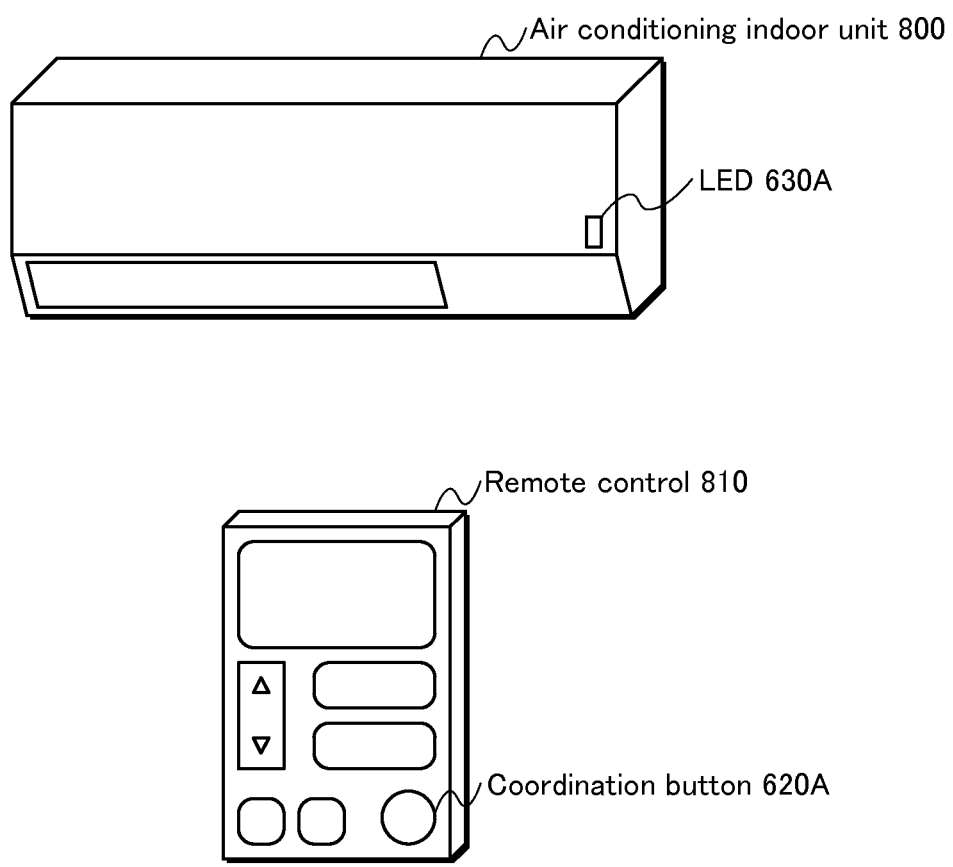
FIG. 8 is a perspective view diagram showing an exterior of an air conditioner.

FIG. 8 is a perspective diagram showing the exterior of an air conditioner, in a case in which the device 510 is an air conditioner.

The air conditioner is composed of an air conditioning indoor unit 800, a remote control 810, and an air conditioning outdoor unit that is not shown in FIG. 8.

The air conditioning indoor unit 800 includes an LED 630A on a surface of a housing of the air conditioning indoor unit 800. The remote control 810 includes a coordination button 620A in a group of operation buttons included on a surface of a housing of the remote control 810.

Figure 9:
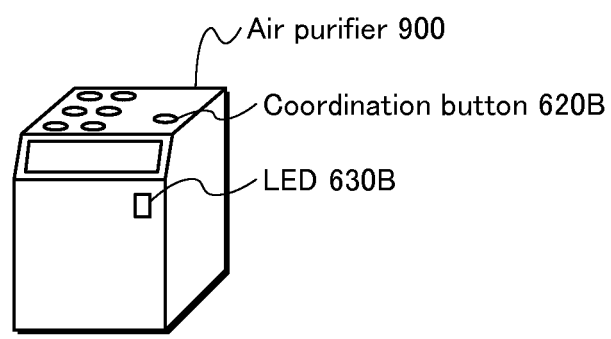
FIG. 9 is a perspective view diagram showing an exterior of an air purifier 900.

FIG. 9 is a perspective diagram showing an exterior of an air purifier 900, in a case in which the device 510 is an air purifier 900.

The air purifier 900 includes an operation panel that is composed of a group of operation buttons on an upper surface of a housing of the air purifier 900. The operation buttons can be operated to operate the air purifier 900. The air purifier 900 also includes an LED 630B on a front surface of the housing of the air purifier 900.

Furthermore, a coordination button 620B is included in the operation buttons on the operation panel.

The home gateway 520A and the home gateway 520B in FIG. 1 are each a wireless router installed in the house, and have a function of relaying communication between the device 510 and the server device 540.

The following does not describe the home gateway 520A and the home gateway 5209 separately; instead the home gateway 520A and the home gateway 520B are described using the home gateway 520 representing the home gateway 520A and the home gateway 520B.

Figure 10:
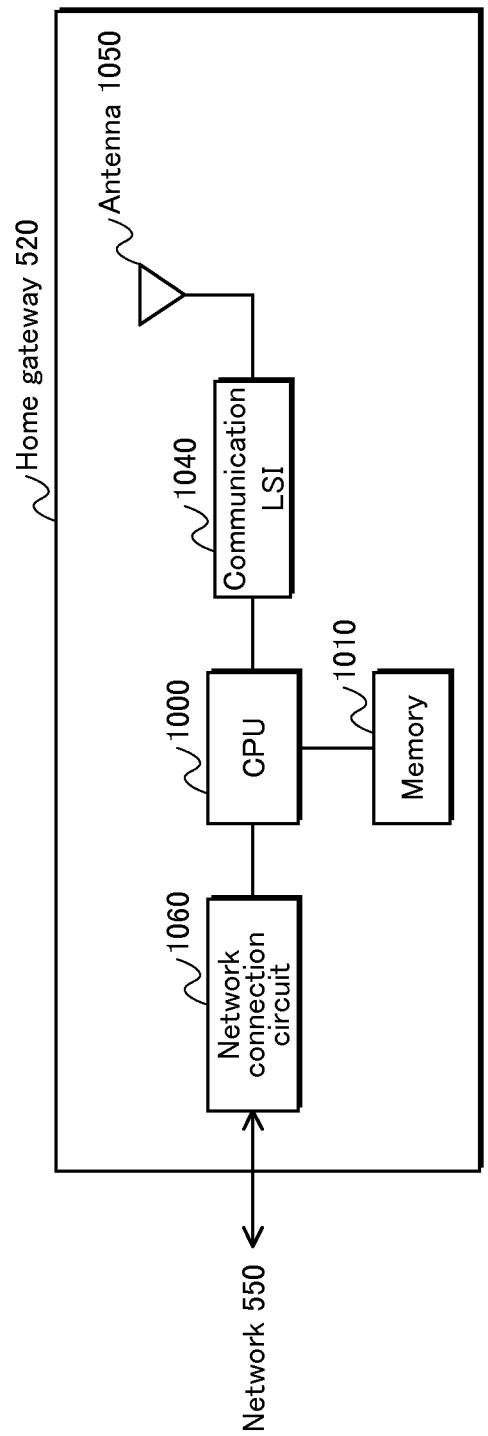
FIG. 10 is a circuit diagram of a home gateway 520.

FIG. 10 is a circuit diagram of the home gateway 520

As shown in FIG. 10, the home gateway 520 includes a CPU 1000, a memory 1010, a communication LSI 1040, an antenna 1050, and a network connection circuit 1060.

The antenna 1050 is connected to the communication LSI 1040 and is used for communication performed by the communication LSI 1040. For example, the antenna 1050 may be a metal monopole antenna.

The communication LSI 1040 is connected to the antenna 1050 and the CPU 1000. The communication LSI 1040 is controlled by the CPU 1000. The communication LSI 1040 has a modulation function of modulating transmission signals sent from the CPU 1000, a transmission function of transmitting the modulated signals to the device 510 by using the antenna 1050, a reception function of receiving, by using the antenna 1050, signals sent from the device 510, and a demodulation function of demodulating and sending the signals received to the CPU 1000.

Here, the communication between the communication LSI 1040 and the device 510 is, for example, performed in accordance with the Bluetooth standard.

The network connection circuit 1060 is connected to the CPU 1000 and the network 550. The network connection circuit 1060 is controlled by the CPU 1000. The network connection circuit 1060 has a function of receiving a signal transmitted from an external device via the network 550, and transmitting the signal to the CPU 1000. The network connection circuit 1060 also has a function of receiving a signal transmitted from the CPU 1000, and transmitting the signal to an external device via the network 550.

The memory 1010 is connected to the CPU 1000, and includes RAM, ROM, and flash memory. The memory 1010 stores a program that regulates operations of the CPU 1000, stores data used by the CPU 1000, and stores an IP address assigned to the home gateway 520 by the network 550, when the home gateway 520 is connected to the network 550.

The CPU 1000 is connected to the memory 1010, the communication LSI 1040, and the network connection circuit 1060. The CPU 1000 has a function of causing implementation of a communication relay function of the home gateway 520, by executing the program stored in the memory 1010 to control the communication LSI 1040 and the network connection circuit 1060. The communication relay function causes the home gateway 520 to relay communication between the device 510 and the server device 540.

Focussing on function, the structure of the home gateway which includes the circuit structure described above, is described below.

Figure 11:
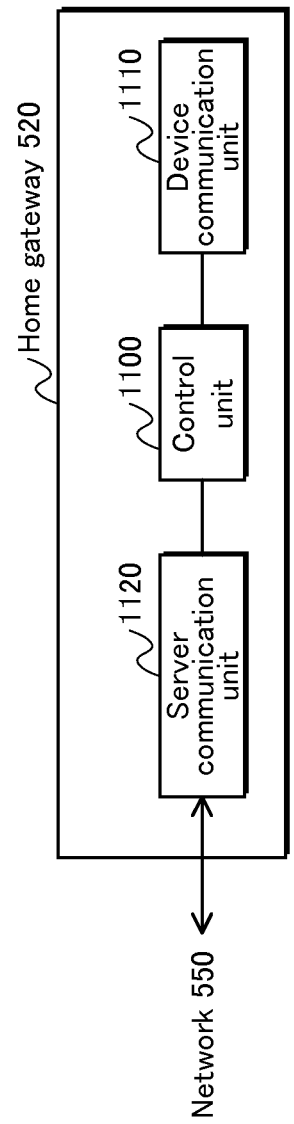
FIG. 11 is a block diagram showing function blocks of the home gateway 520.

FIG. 11 is a block diagram showing function blocks of the home gateway 520.

As shown in FIG. 11, the home gateway 520 includes a control unit 1100, a device communication unit 1110, and a server communication unit 1120.

The device communication unit 1110 is implemented by the CPU 1000 executing a program, the communication LSI 1040, and the antenna 1050. The device communication unit 1110 is controlled by the control unit 1100, and has a function of communicating with the device 510 according to the Bluetooth standard.

The server communication unit 1120 is implemented by the CPU 1000 executing a program, and the network connection circuit 1060. The server communication unit 1120 is controlled by the control unit 1100, and has a function of communicating with the server device 540 via the network 550.

The control unit 1100 is implemented by the CPU 1000 executing a program. The control unit 1100 has a function of causing the home gateway 520 to implement the above-mentioned communication relay function, by controlling the device communication unit 1110 and the server communication unit 1120.

The network 550 in FIG. 1 is a network that is connected to the home gateway 150 and the server device 160. The network 550 has a function of assigning a unique IP address to each device connected to the network 550, and a function of transmitting signals between devices connected to the network 550.

Figure 12:
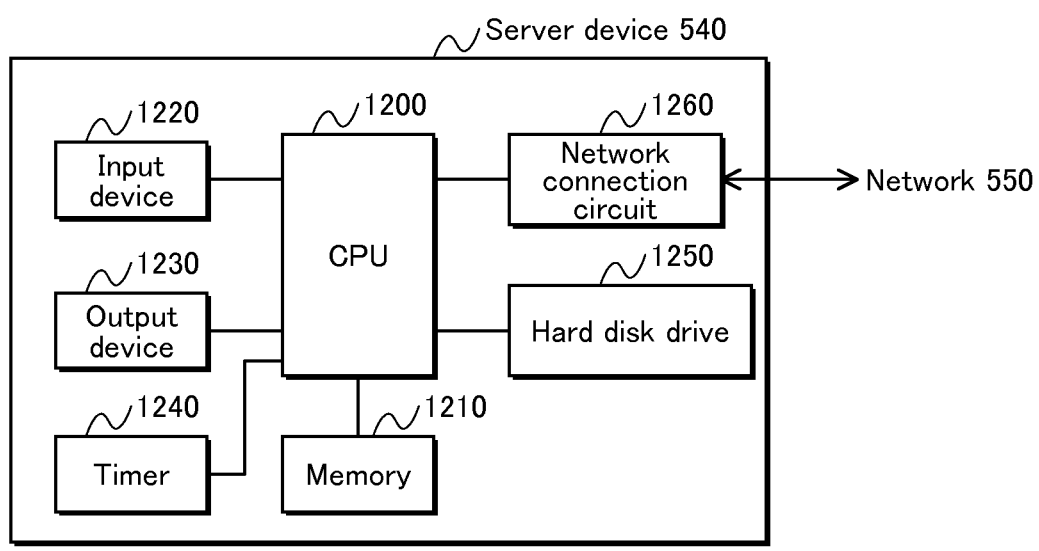
FIG. 12 is a circuit diagram of a server device 540.

FIG. 12 is a circuit diagram of the server device 540.

The server device 540 is connected to the network 550. The server device 540 is a so-called computer device.

As shown in FIG. 12, the server device 540 includes a CPU 1200, a memory 1210, an input device 1220, an output device 1230, a timer 1240, a hard disk drive 1250, and a network connection circuit 1260.

The input device 1220 is connected to the CPU 1200. The input device 1220 has a function of converting actions performed by the user of the server device 540 into electric signals, and sending the electric signals to the CPU 1200. The input device 1220 is implemented by, for example, a keyboard, a mouse, etc.

The output device 1230 is connected to the CPU 1200. The output device 1230 has a function of generating and displaying an image based on an image signal transmitted from the CPU 1200. The output device 1230 is implemented by for example, a liquid crystal display.

A timer 1240 is connected to the CPU 1200, and is con rolled by the CPU 1200.

The network connection circuit 1260 is connected to the CPU 1200 and the network 550. The network connection circuit 1260 is controlled by the CPU 1200. The network connection circuit 1260 has a function of receiving a signal transmitted from an external device via the network 550, and transmitting the signal to the CPU 1200. The network connection circuit 1260 also has a function of receiving a signal transmitted from the CPU 1200, and transmitting the signal to an external device, via the network 550.

The memory 1210 is connected to the CPU 1200, and includes RAM, ROM, and flash memory. The memory 1210 stores a program that regulates operations of the CPU 1200, and stores data used by the CPU 1200.

The hard disk drive 1250 is connected to the CPU 1200. The hard disk drive 1250 incorporates a hard disk, and stores data used by the CPU 1200.

The CPU 1200 is connected to the memory 1210, the input device 1220, the output device 1230, the hard disk drive 1250, and the network connection circuit 1260. The CPU 1200 has a function of causing the server device 540 to implement the following two functions. The CPU 1200 achieves this function by controlling the input device 1220, the output device 1230, the hard disk drive 1250, and the network connection circuit 1260, by executing the program stored in the memory 1210.

Classification process implementation function B: A function of implementing, by controlling the server device 540, the classification process of the device classification system 500 in conjunction with other elements forming the device classification system 500.

Coordination process implementation function B: A function of implementing, by controlling the server device 540, the coordination process of the device classification system 500 in conjunction with other elements forming the device classification system 500.

Focussing on function, the structure of the server device 540, which includes the circuit structure described above, is described below.

Figure 13:
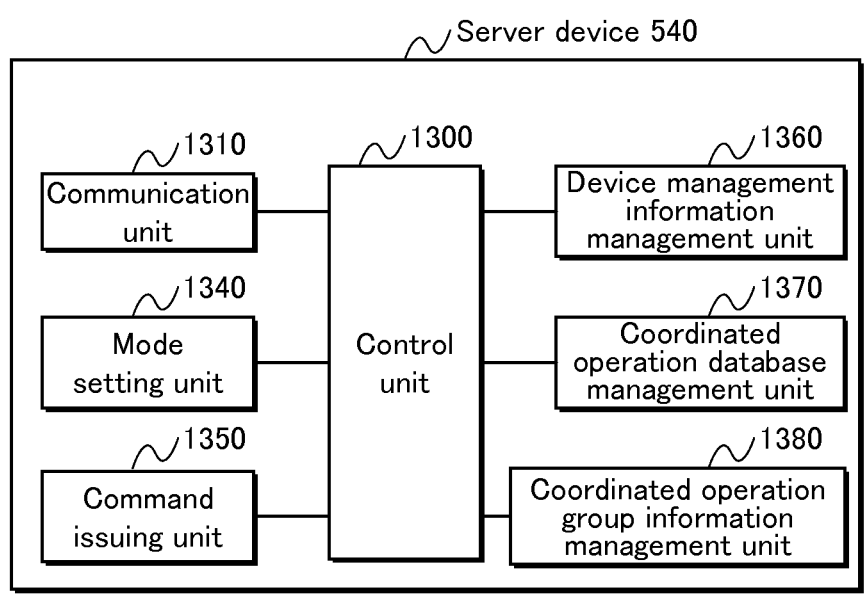
FIG. 13 is a block diagram showing function blocks of the server device 540.

FIG. 13 is a block diagram showing function blocks of the server device 540.

As shown in FIG. 13, the server device 540 includes a control unit 1300, a communication unit 1310, a mode setting unit 1340, a command issuing unit 1350, a device management information management unit 1360, a coordinated operation database management unit 1370, and a coordinated operation group information management unit 1380.

The communication unit 1310 is implemented by the CPU 1200 executing a program, and the network connection circuit 1260. The communication unit 1310 is controlled by the control unit 1300. The communication unit 1310 has a function of communicating with the home gateway 520 via the network 550, and a function of communicating with the device 510, via the network 550 and the home gateway 520.

The device management information management unit 1360 is implemented by the CPU 1200 executing a program, and a part of a storage area included in the hard disk drive 1250. The device and information management unit 1360 has a function of storing the device management information 1400, and of updating the device management information 1400.

FIG. 14 is a data structure diagram showing one example of the device management information 1400 stored by the device management information management unit 1360.

As shown in FIG. 14, the device management information 1400 includes device IDs 1410, product codes 1420, IP addresses 1430, group IDs 1440, and coordinated operation group Ms 1450. A device ID 1410, a product code 1420, an IP address 1430, a group ID 1440, and a coordinated operation group ID 1450 are associated with each other.

The device management information 1400 is information used for managing the device 510 included in the device classification system 500. This device management information 1400 is, in the initial state of the device classification system 500, created by an administrator who manages the device classification system 500 and stored by the device and information management unit 1360. After creation, the device management information 1400 is updated as required, by the device management information management unit 1360.

Each device ID 1410 is an identifier that identifies a device 510 included in the device classification system 500.

Each product code 1420 is a product code of the device 510 that is identified by an associated device ID 1410. In this example, the product code is composed of one alphabet character and seven digits. The alphabet character and the first digit indicate the device type of a device, and the next six digits indicate a manufacturing number of the device (i.e., an identifier that can be used to identify the device).

Each IP address 1430 is an IP address of a home gateway 520 that communicates with the device 510 that is identified by an associated device ID 1410. This IP address is assigned to a home gateway 520 when the home gateway 520 is connected to the network 550.

Each group ID 1440 is an identifier that identifies the group to which the device 510 that is identified by an associated device ID 1410 belongs.

Each device 510 that belongs to the device classification system 500 is managed by using the device management information 1400 so that each device 510 belongs to one group. In other words, each device 510 that belongs to a given group is associated with each other device 510 that belongs to the given group by being associated with the group ID 1440 that identifies the given group. Thus, each device 510 that belongs to the given group is managed as belonging to the given group.

Here, it is assumed that the group IDs 1440 are such that one group ID is assigned for each user that uses the device classification system 500. Therefore, each device 510 owned by a given user (in other words, each device positioned in the house of the user) is associated with each other device 510 owned by the user, by being associated with the group ID assigned to the user. Thus, each such device 510 is managed as belonging to the group that is identified by the group ID. Alternatively, as a different example, each home gateway 520 may be assigned one group ID. In the case of this example, each device 510 that communicates with a given home gateway 520 is associated with each other device 510 that communicates with the home gateway 520, by being associated with a group ID that is assigned to the home gateway 520. Thus, each such device 510 is managed as belonging to the group that is identified by the group ID.

Each coordinated operation group ID 1450 is an identifier that identifies the coordinated operation group to which the device 510 that is identified by an associated device ID 1410 belongs.

Each device 510 that belongs to a given coordinated operation group is associated with each other device 510 that belongs to the given coordinated operation group, by being associated with a coordinated operation group ID 1450 that identifies the given coordinated operation group. Thus, each such device 510 is managed as belonging to the given coordinated operation group.

Here, a device ID 1410 of a device 510 that is classified as belonging to a plurality of coordinated operation groups is associated with a plurality of coordinated operation group IDs. Also, a device ID 1410 of a device 510 that is not classified as belonging to a coordinated operation group is not associated with a coordinated operation group ID.

Returning to FIG. 13, the following continues description of the functional structure of the server device 540.

The coordinated operation database management unit 1370 is implemented by the CPU 1200 executing a program, and a part of the storage area included in the hard disk drive 1250. The coordinated operation database management unit 1370 has a function of storing the coordinated operation database 1500.

FIG. 15 is a data structure diagram of one example of the coordinated operation database 1500 stored by the coordinated operation database management unit 1370.

As shown in FIG. 15, the coordinated operation database 1500 includes coordinated operation IDs 1510, processing orders 1520, device types 1530, trigger flags 1540, device type codes 1550, and transmission commands 1560. A coordinated operation ID 1510, a processing order 1520, a device type 1530, a trigger flag 1540, a device type code 1550, and a transmission command 1560 are associated with each other.

The coordinated operation database 1500 is a database for defining each coordinated operation that may be subject to execution in the device classification system 500. The coordinated operation database 1500 is, in the initial state of the device classification system 500, created by the administrator who manages the device classification system 500. The coordinated operation database 1500 is stored by the device management information management unit 1360.

Each coordinated operation ID 1510 is an identifier that identifies a coordinated operation that may be subject to execution in the device classification system 500.

Each processing order 1520 is information that specifies a processing order of a coordinated operation identified by an associated coordinated operation ID.

Each device type 1530 indicates a device type of a device that is included in a coordinated operation identified by an associated coordinated operation ID.

Each trigger flag 1540 is a flag that specifies whether or not a device of an associated device type 1530 is, in a coordinated operation identified by an associated coordinated operation ID, a device that can trigger the coordinated operation. In this example, a trigger flag 1540 has a logical value of "1" in a case in which a corresponding device can be a trigger, and has a logical value of "0" in a case in which a corresponding device cannot be a trigger.

Further, more than one trigger flag 1540 that has a logical value of "1" is never associated with a given device type 1530 (for example, air conditioner). In other words, a coordinated operation started by a given device type 1530 (for example, air conditioner), is uniquely determinable.

A device type code 1550 is information that indicates a device type. In this example, the device type code 1550 is composed of one alphabet character and the first digit from the product code 1420 (refer to FIG. 14).

Each transmission command 1560 is transmitted to a device of the device type indicated by an associated device type code 1550 to cause the device to execute a predetermined operation in a coordinated operation indicated by an associated coordinated operation ID 1510. The transmission command 1560 is a command for causing the device main body hardware 660 of the device to operate.

Returning to FIG. 13, the following continues description of the functional structure of the server device 540.

The coordinated operation group information management unit 1380 is implemented by the CPU 1200 executing a program and a part of a storage area included in the hard disk drive 1250. The coordinated operation group information management unit 1380 has a function of storing the coordinated operation group information 1600, and a function of updating the coordinated operation group information 1600.

FIG. 16 is a data structure diagram showing one example of the coordinated operation group information 1600 stored by the coordinated operation group information management unit 1380.

As shown in FIG. 16, the coordinated operation group information 1600 includes coordinated operation group IDs 1610, processing orders 1620, device types 1630, trigger flags 1640, device type codes 1650, and device IDs 1670. A coordinated operation group ID 1610, a processing order 1620, a device type 1630, a trigger flag 1640, a device type code 1650, and a device ID 1670 are associated with each other.

The coordinated operation group information 1600 is information used for managing a coordinated operation group used in the device classification system 500. This coordinated operation group information 1600 is, in the initial state of the device classification system 500, created by the administrator who manages the device classification system 500 and stored by the coordinated operation group information management unit 1380. After creation, the coordinated operation group information 1600 is updated as required, by the coordinated operation group information management unit 1380.

The coordinated operation group ID 1610 is an identifier that identifies a coordinated operation group used in the device classification system 500.

The processing orders 1620, the device types 1630, the trigger flags 1640, and transmission commands 1660 are equivalent to the processing orders 1520, the device types 1530, the trigger flags 1540, and the transmission commands 1560 in FIG. 15. Accordingly, the processing orders 1620, the device types 1630, the trigger flags 1640, and the transmission commands 1660 have already been described.

The device IDs 1670 are equivalent to the device IDs 1410 in FIG. 14. Accordingly, the device IDs 1670 have already been described.

Returning to FIG. 13, the following continues description of the functional structure of the server device 540.

The mode setting unit 1340 is implemented by the CPU 1200 executing a program. The mode setting unit 1340 is controlled by the control unit 1300. The mode setting unit 1340 has a function of transmitting a classification mode setting signal to the device 510, by using the communication unit 1310. The classification mode setting signal indicates that the operation mode of the device 510 is to be set to the classification mode.

The command issuing unit 1350 is implemented by the CPU 1200 executing a program. The command issuing unit 1350 is controlled by the control unit 1300. When devices classified as belonging to a coordinated operation group are caused to operate in coordination with each other, the command issuing unit 1350 (i) references the coordinated operation group information 1600 that is stored in the coordinated operation group information management unit 1380, (ii) generates a transmission command 1660 to transmit to each device classified as belonging to the coordinated operation group, and (iii) transmits each created transmission command 1660 to a corresponding device by using the communication unit 1310, according to a processing order specified by the processing order 1620.

Operations performed by the device classification system 500, which has a structure as described above, are described below with reference to the drawings.

<Operations>

The device classification system 500 performs the classification process and the coordination process, as operations that characterize the device classification system 500.

Below are descriptions of the classification process and the coordination process, described in turn.

<Classification Process>

The classification process is a process performed by the device classification system 500. The classification process is a process in which devices 510 specified by a user who uses the device classification system 500 are classified as belonging to a new coordinated operation group.

Figure 17:
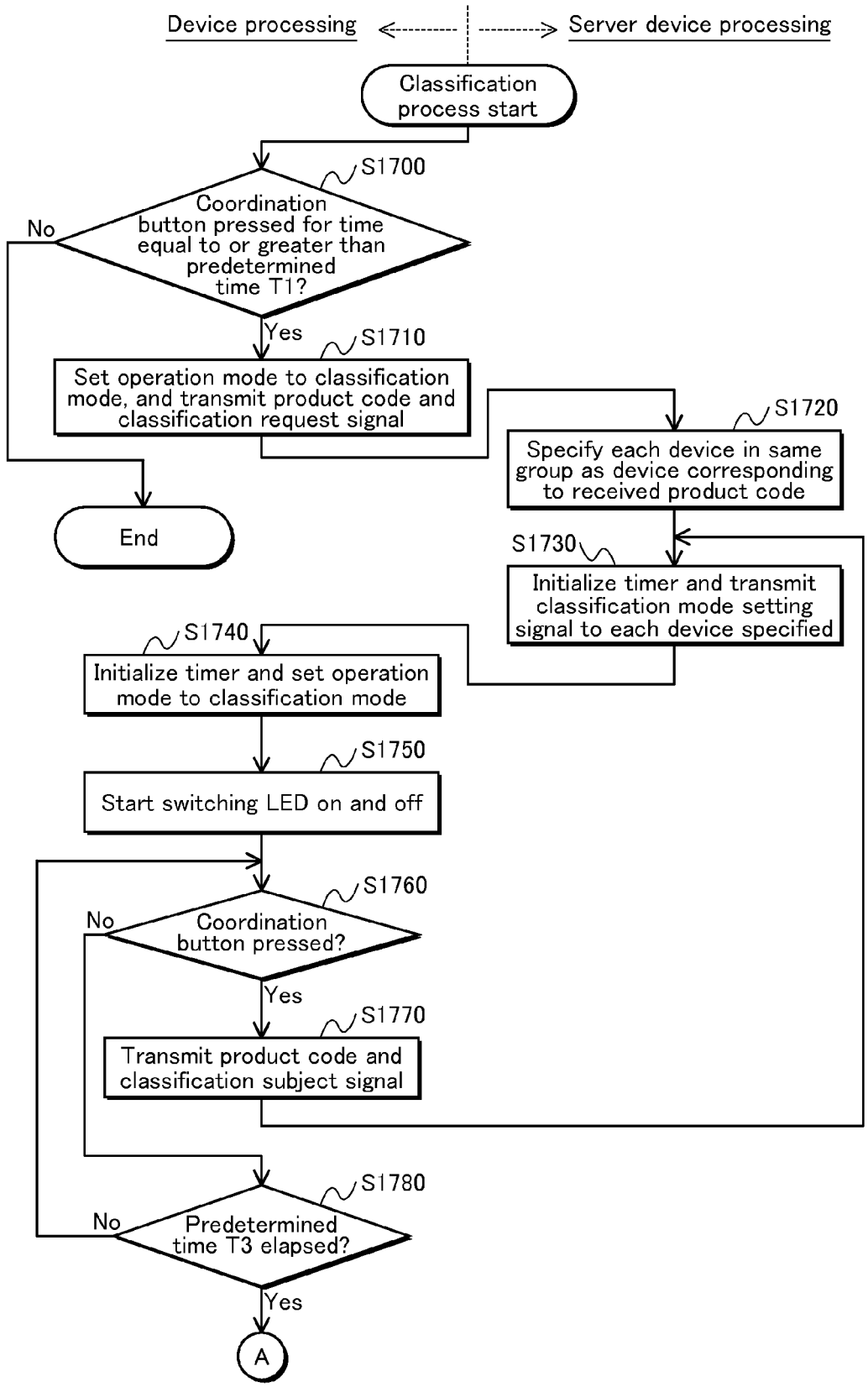
FIG. 17 is part 1 of a flowchart of a classification process.
Figure 18:
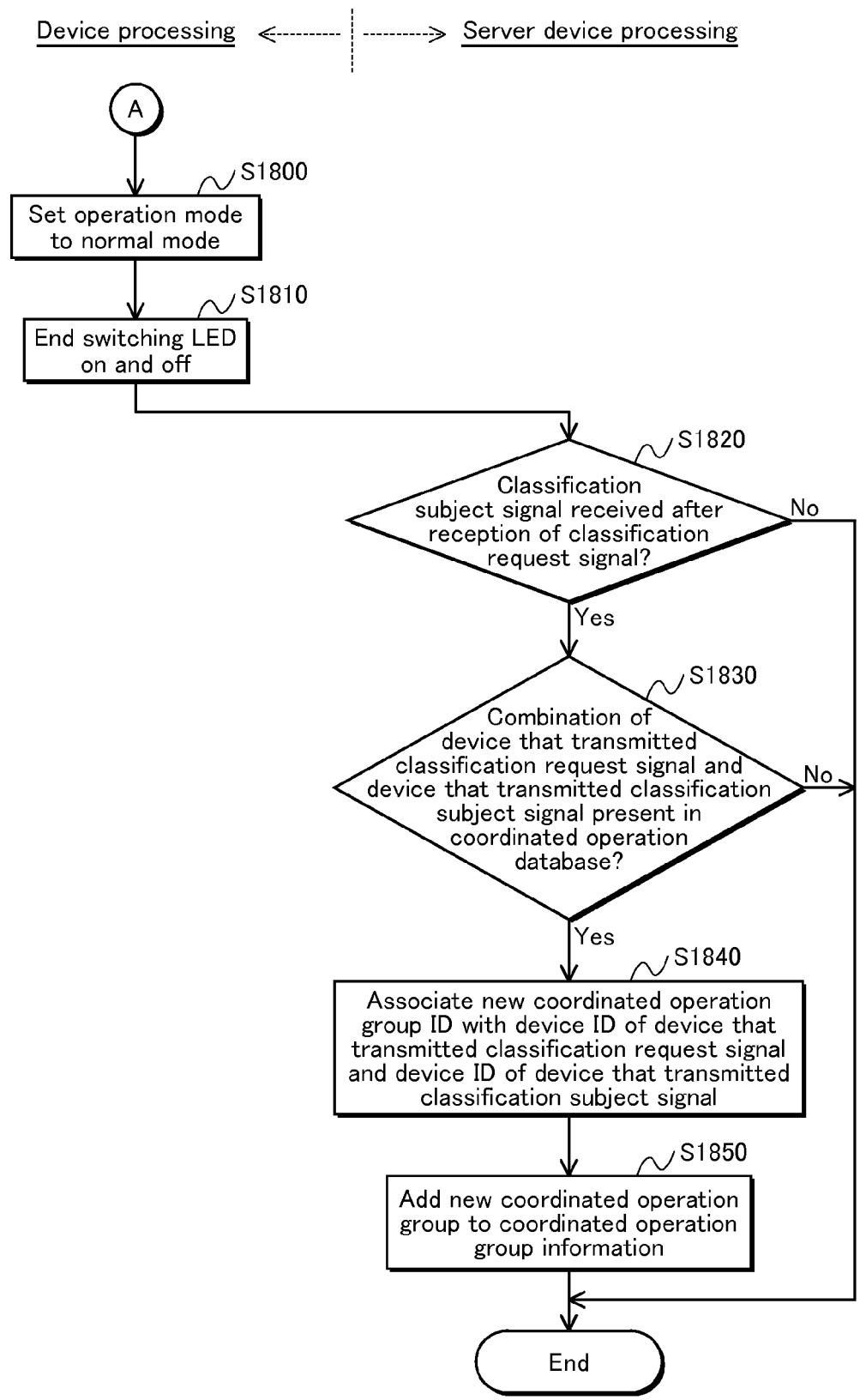
FIG. 18 is part 2 of the flowchart of the classification process.

FIG. 17 and FIG. 18 are a flowchart of the classification process.

The classification process is started by the pressing of the coordination button 620 of a device 510, whose operation mode is the normal mode.

When the classification process is started, the mode setting unit 770 uses the timer 625 to measure a duration for which the coordination button 620 is pressed, and checks whether or not the duration for which the coordination button 620 is pressed is equal to or greater than a predetermined time T1 (for example, three seconds) (step S1700).

If the duration for which the coordination button 620 is pressed is equal to or greater than the predetermined time T1 in step S1700 ("Yes" in step S1700), the mode setting unit 770 sets the operation mode of the device 510 to the classification mode. Then, the communication unit 740 transmits a product code of the device 510 and a classification request signal to the server device 540 (step S1710). The product code is stored by the device information storage unit 760. The classification request signal indicates a request to the server device 540 to create a new coordinated operation group, and to classify the device 510 as belonging to the new coordinated operation group.

When the communication unit 1310 of the server device 540 receives the product code 1420 and the classification request signal, the mode setting unit 1340 references the device management information 1400 stored in the device management information management unit 1360, and specifies each device 510 that belongs to a group identified by the group ID 1440 that is associated with the product code 1420 received (step S1720). Next, the mode setting unit 1340 initializes the timer 1240 and starts measuring the time until a predetermined time T2 elapses (for example, 40 seconds), and transmits, by using the communication unit 740, the classification mode setting signal that indicates a request to set the operation mode to the classification mode, to each device 510 that is specified in step S1720 (step S1730).

When the communication unit 740 of each device 510 specified in step S1720 receives the classification mode setting signal, the mode setting unit 770 of the device 510 that receives the classification mode setting signal initializes the timer 625, starts measuring the time until a predetermined time T3 elapses for example, 30 seconds; predetermined time T3 <predetermined time T2), and sets the operation mode of the corresponding device 510 to the classification mode (step S1740).

In the processing of step S1740, even if the mode setting unit 770 is already measuring the predetermined time T3 using the timer 625, the mode setting unit 770 initializes the timer 625 and newly starts measuring the time from the moment of initializing the timer 625 until the predetermined time T3 elapses.

When the operation mode of the device 510 is set to the classification mode in step S1740, the LED lighting unit 730 causes the LED 630 to start switching on and off in the predetermined pattern (for example, in a one second cycle) (step S1750).

When the switching on and off of the LED 630 is started, the input unit 710 waits for the coordination button 620 to be pressed during the period of the predetermined time T3 measured by the timer 625 ("No" at step S1760 and "No" at step S1780 are repeated).

If the coordination button 620 is pressed during the period of the predetermined time T3 measured by the timer 625 ("Yes" at step S1760 after repeating "No" at step S1760 and "No" at step S1780), the input unit 710 transmits, by using the communication unit 740, a classification subject signal and the product code of the device 510 to the server device 540 (step S1770). The classification subject signal indicates a request to the server device 540 to classify the device 510 as belonging to the new coordinated operation group. The product code is stored in the device information storage unit 760.

When step S1770 is completed, the device classification system 500 returns to step S1730, and repeats the process from step S1730.

Here, when step S1730 is repeated, even if the mode setting unit 1340 is already measuring the predetermined time T2 using the timer 1240, the mode setting unit 1340 initializes the timer 1240 and starts measuring the time from the moment of initializing the timer 1240 until the new predetermined time T2 elapses.

If the coordination button 620 is not pressed during the period of the predetermined time T3 measured by the timer 625 ("Yes" at step S1780 after repeating "No" at step S1760 and "No" at step S1780), the mode setting unit 770 sets the operation mode of the device 510 to the normal mode (step S1800; refer to FIG. 18).

If the operation mode of the device 510 is set to the normal mode in step S1800, the LED lighting unit 730 causes the switching on and off of the LED 630 to stop (step S1810).

When the mode setting unit 1340 finishes measurement of the predetermined time T2 using the timer 1240, the communication unit 1310 of the server device 540 checks whether or not a classification subject signal was received after a classification request signal had been received (step S1820).

If a classification subject signal was received after a classification request signal had been received in step S1820 ("Yes" in step S1820), the coordinated operation database management unit 1370 references the device management information 1400 stored in the device management information management unit 1360, and checks whether or not a combination of the device type of the device 510 transmitting the classification request signal and the device type of the device 510 transmitting the classification subject signal is present in the coordinated operation database 1500 (step S1830).

If the combination of the device type of the device 510 transmitting the classification request signal and the device type of the device 510 transmitting the classification subject signal is present in step S1830 ("Yes" in step S1830), the device management information management unit 1360 updates the device management information 1400 by associating a new coordinated operation group ID 1450 with the device ID 1410 of the device 510 transmitting the classification request signal and the device ID 1410 of each device 510 transmitting the classification subject signal (step S1840). Next, the coordinated operation group information management unit 1380 references the coordinated operation database 1500 stored in the coordinated operation database management unit 1370, and updates the coordinated operation group information 1600 by adding a new coordinated operation group (step S1850). The new coordinated operation group is added by associating with the new coordinated operation group ID 1450 the device ID 1410 of the device 510 transmitting the classification request signal, the device ID 1410 of the device 510 transmitting the classification subject signal, a processing order 1520, a device type 1530, and a trigger flag 1540.

The device classification system 500 ends the classification process when any of the following occur: (i) In step S1700 (refer to FIG. 17), the duration for which the coordination button 620 is pressed is not equal to or greater than the predetermined time T1 ("No" at step S1700); (ii) in step S1820, a classification subject signal is not received after the classification request signal is received ("No" at step S1820), (iii) in step S1830, the combination of the device type of the device 510 transmitting the classification request signal and the device type of the device 510 transmitting the classification subject signal is not present ("No" at step S1830); or (iv) step S1850 finishes.

<Coordination Process>

The coordination process is a process performed by the device classification system 500. The coordination process is a process that causes devices that are classified as belonging to a coordinated operation group to operate in coordination with each other, based on an action from a user who uses the device classification system 500.

Figure 19:
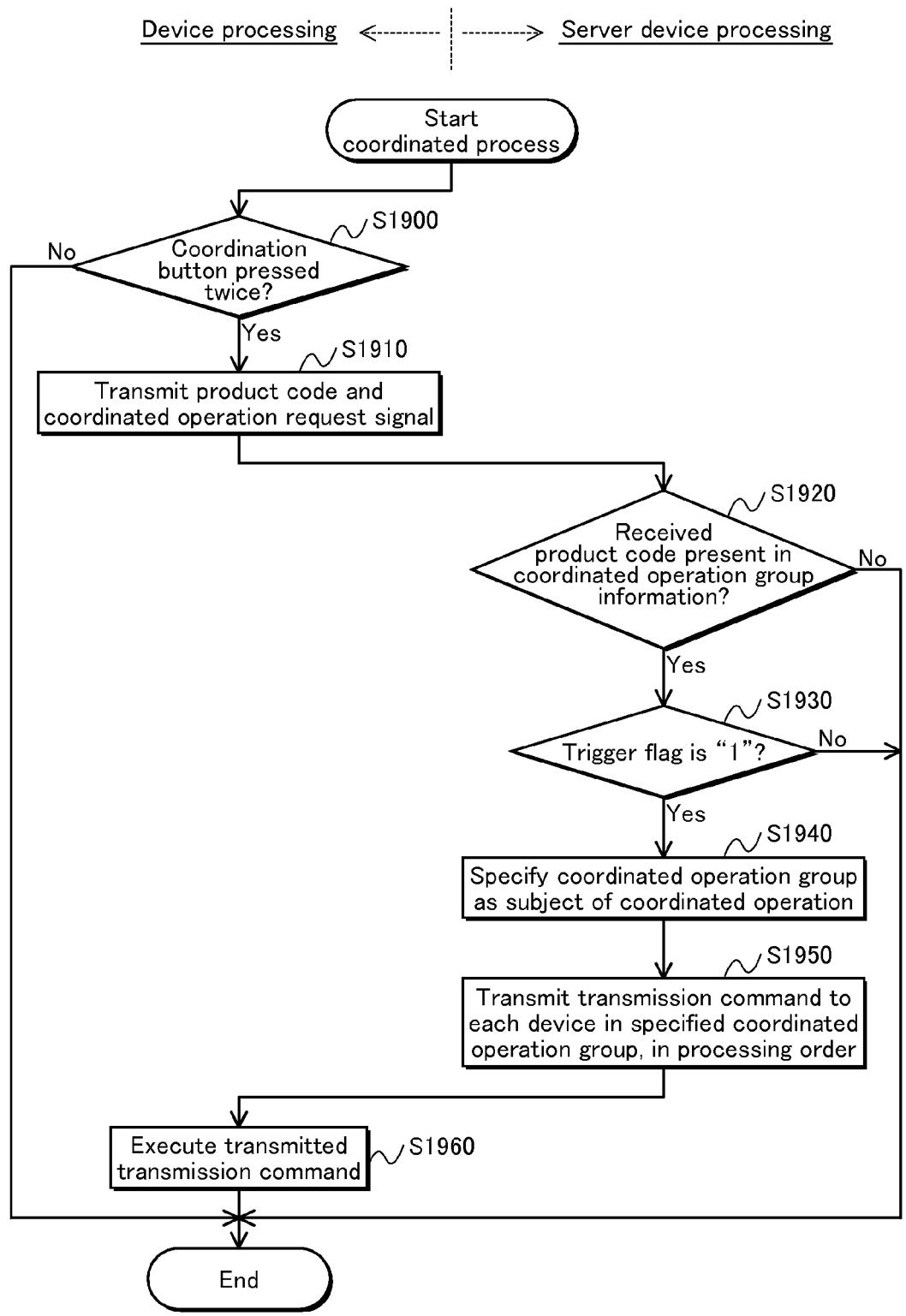
FIG. 19 is a flowchart of a coordination process.

FIG. 19 is a flowchart of the coordination process.

The coordination process starts by the pressing of the coordination button 620 of a device 510 whose operation mode is the normal mode.

When the coordination process is started, the mode setting unit 770 checks, by using the timer 625, whether or not the coordination button 620 is pressed twice in succession before a predetermined time T1 elapses (step S1900).

If the coordination button 620 is pressed twice in succession before the predetermined time T1 elapses in step S1900 ("Yes" in step S1900), the communication unit 740 transmits the product code of the device and a coordinated operation request signal to the server device 540 (step S1910). The product code is stored in the device information storage unit 760. The coordinated operation request signal indicates a request that the server device 540 start a coordinated operation.

When the communication unit 1310 of the server device 540 receives the product code 1420 and the coordinated operation request, the coordinated operation group information management unit 1380 references the device management information 1400 stored in the device management information management unit 1360, and checks whether or not a device ID 1410 associated with the received product code 1420 is present in the coordinated operation group information 1600 (step S1920).

If a device ID 1410 associated with the product code 1420 is present in the coordinated operation group information 1600 in step S1920 ("Yes" in step S1920), the coordinated operation group information management unit 1380 checks whether or not the logical value of the trigger flag 1640 associated with the device ID 1410 associated with the received product code 1420 is "1" (step S1930).

If the logical value of the trigger flag 1640 is "1" in step S1930 ("Yes" in step S1930), the coordinated operation group information management unit 1380 specifies the coordinated operation group ID 1610 associated with the trigger flag 1640 as an identifier that specifics the coordinated operation group that is subject to the coordination operation (step S1940).

When the coordinated operation group ID 1610 is specified, the coordinated operation group information management unit 1380 transmits, to each device 510 that is identified by a device ID 1670 associated with the specified coordinated operation group ID 1610, a corresponding transmission command 1660 associated with the specified coordinated operation group ID 1610 (step S1950). The transmission of the transmission command 1660 is performed according to an associated processing order 1620, and by using the communication unit 1310.

In each device 510 that receives a transmitted transmission command 1660, when the communication unit 740 receives a transmission command 1660, the execution unit 720 executes a predetermined operation specified by the received transmission command 1660, by using the device body hardware 660 (step S1960).

The device classification system 500 ends the coordination process when any of the following occur: (i) In step S1900, the coordination button 620 is not pressed twice in succession within the predetermined time T1 ("No" in step S1900); (ii) in step S1920, a device ID 1410 associated with the received product code 1420 is not present in the coordinated operation group information 1600 ("No" in step S1920), (iii) in step S1930, the logical value of the trigger flag 1640 is not "1" ("No" in step S1930); or (iv), step S1960 finishes.

<Embodiment 3>
<Summary>
The following describes a first modified device classification system, in which a portion of the device classification system 500 of embodiment 2 is modified, as an embodiment of a device control method pertaining to the present invention.

The device classification system 500 of embodiment 2 is an example of a configuration in which each device 510 includes a coordination button 620.

In contrast, the first modified device classification system of embodiment 3 is an example of a configuration in which, instead of the coordination button 620, each device 510 includes a touch pad that can receive a slide action from a user. By using this touch pad, it is possible to receive information pertaining to relative positions between devices that are to be classified as belonging to a coordinated operation group.

When this first modified device classification system receives a specification from a user of a plurality of devices that are to be classified as belonging to a new coordinated operation group, the first modified device classification system also receives information pertaining to relative positions between those devices. Among the devices receiving the specification, devices whose relative positions satisfy a predetermined requirement are classified as belonging to the new coordinated operation group.

The following describes details of the first modified device classification system, given with reference to the drawings and focusing on differences from the device classification system 500 of embodiment 2.

<Structure>
The first modified device classification system is modified from the device classification system 500 of embodiment 2, such that the device 510 is modified to a device 2010, and the server device 540 is modified to a server device 2040.

The following is a description of the device 2010 and the server device 2040.

Figure 20:
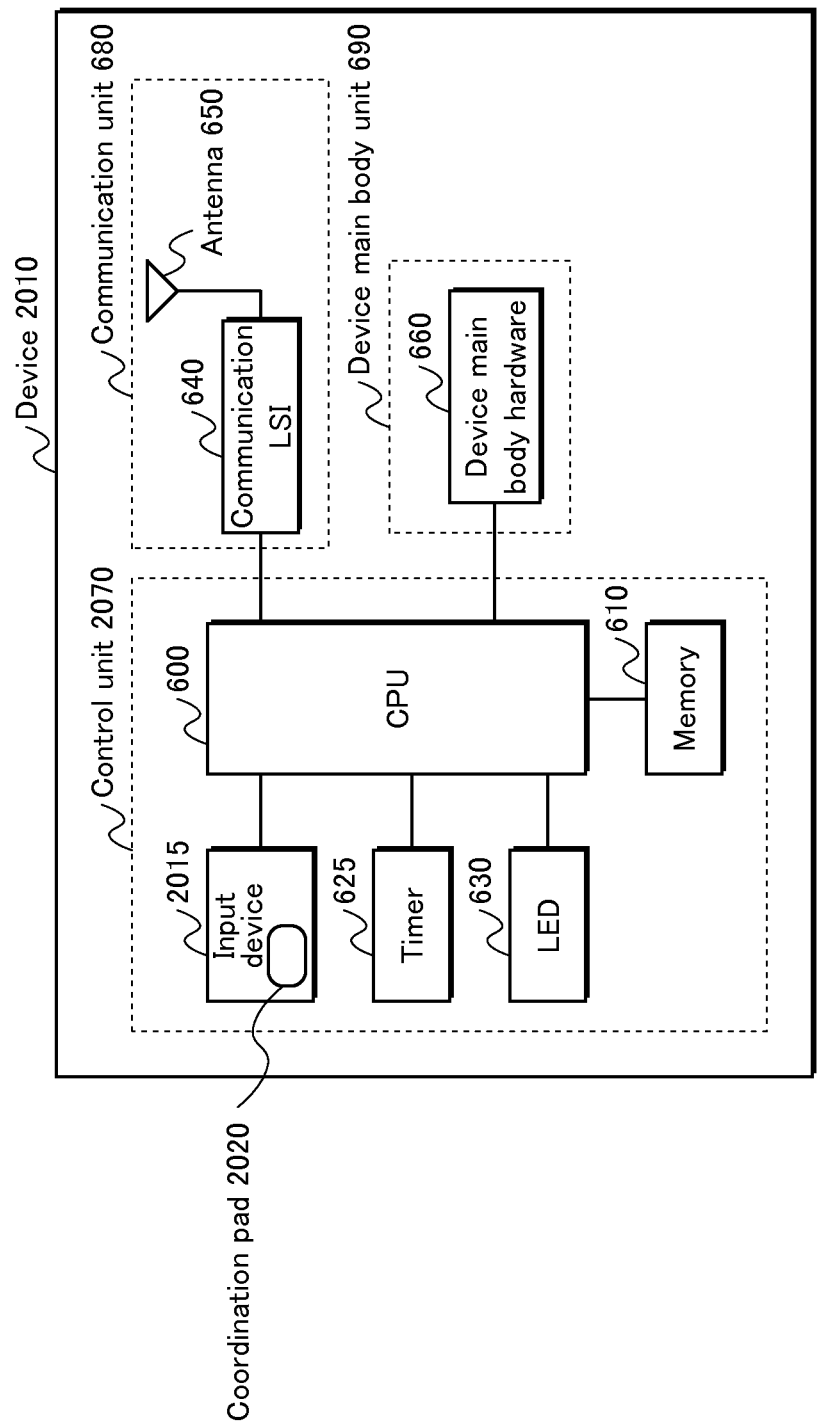
FIG. 20 is a circuit diagram of a device 2010.

FIG. 20 is a circuit diagram of the device 2010.

As shown in FIG. 20, the device 2010 is modified from the device 510 of embodiment 2, such that the input device 615 is modified to an input device 2015. Further, due to this modification, the control unit 670 is modified to a control unit 2070.

The input device 2015 is modified from the input device 615 of embodiment 2, such that the coordination button 620 is modified to a coordination pad 2020.

The coordination pad 2020 includes a touch pad and has a function of receiving a touch action and a slide action from a user.

Here, the touch action is an action in which the user contacts a main surface of the touch pad with a finger, etc., and the slide action is an action in which, in addition to contacting the main surface of the touch pad with a finger, etc., the user slides the finger, etc., along the main surface while maintaining contact.

Figure 21:
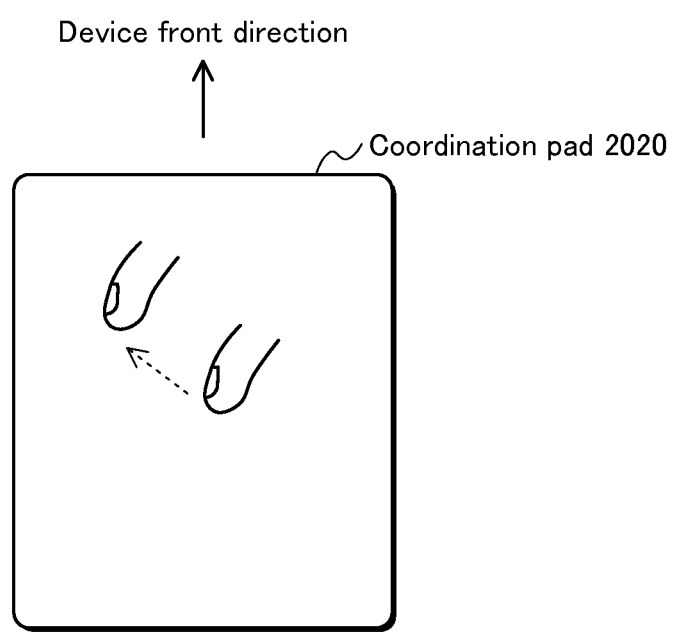
FIG. 21 is a schematic diagram showing a state of a slide action being performed on a coordination pad 2020.

FIG. 21 is a schematic diagram showing a state of a slide action being performed on the coordination pad 2020, by a finger of the user.

As shown in FIG. 21, when the user performs the slide action, the coordination pad 2020 detects an angle between a predetermined direction (in this case, the device front direction) and a direction indicated by the slide action.

Focussing on function, the structure of the device 2010, which includes the circuit structure described above, is described below.

Figure 22:
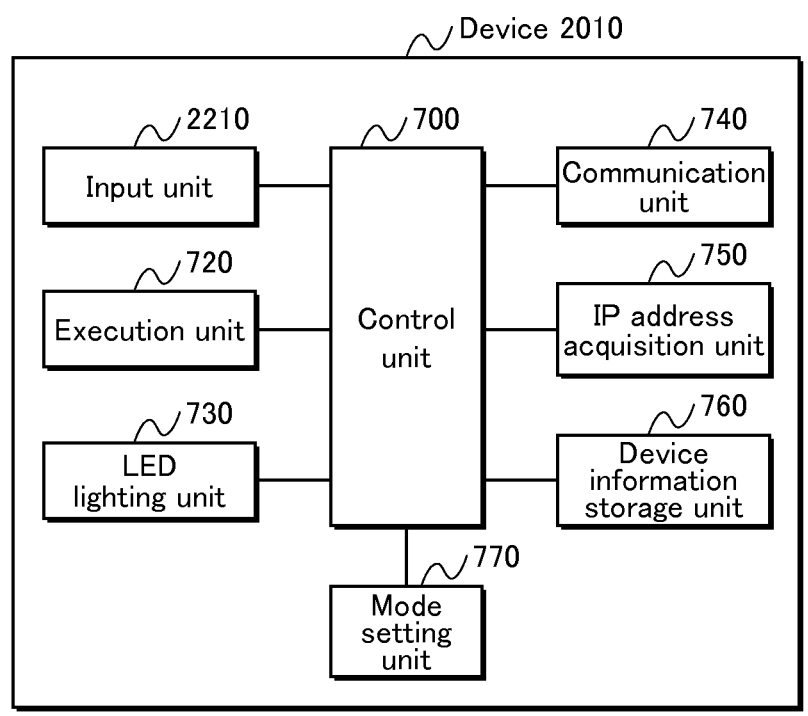
FIG. 22 is a block diagram showing function blocks of the device 2010.

FIG. 22 is a block diagram showing function blocks of the device 2010.

As shown in FIG. 22, the device 2010 is modified from the device 510 of embodiment 2, such that the input unit 710 is modified to an input unit 2210.

The input unit 2210, in addition to the functions of the input unit 710 of embodiment 2, has a function of acquiring, when a slide action is performed on the coordination pad 2020, slide direction information that indicates an angle between the predetermined direction (here, the device front direction) and a direction of the slide action.

Figure 23:
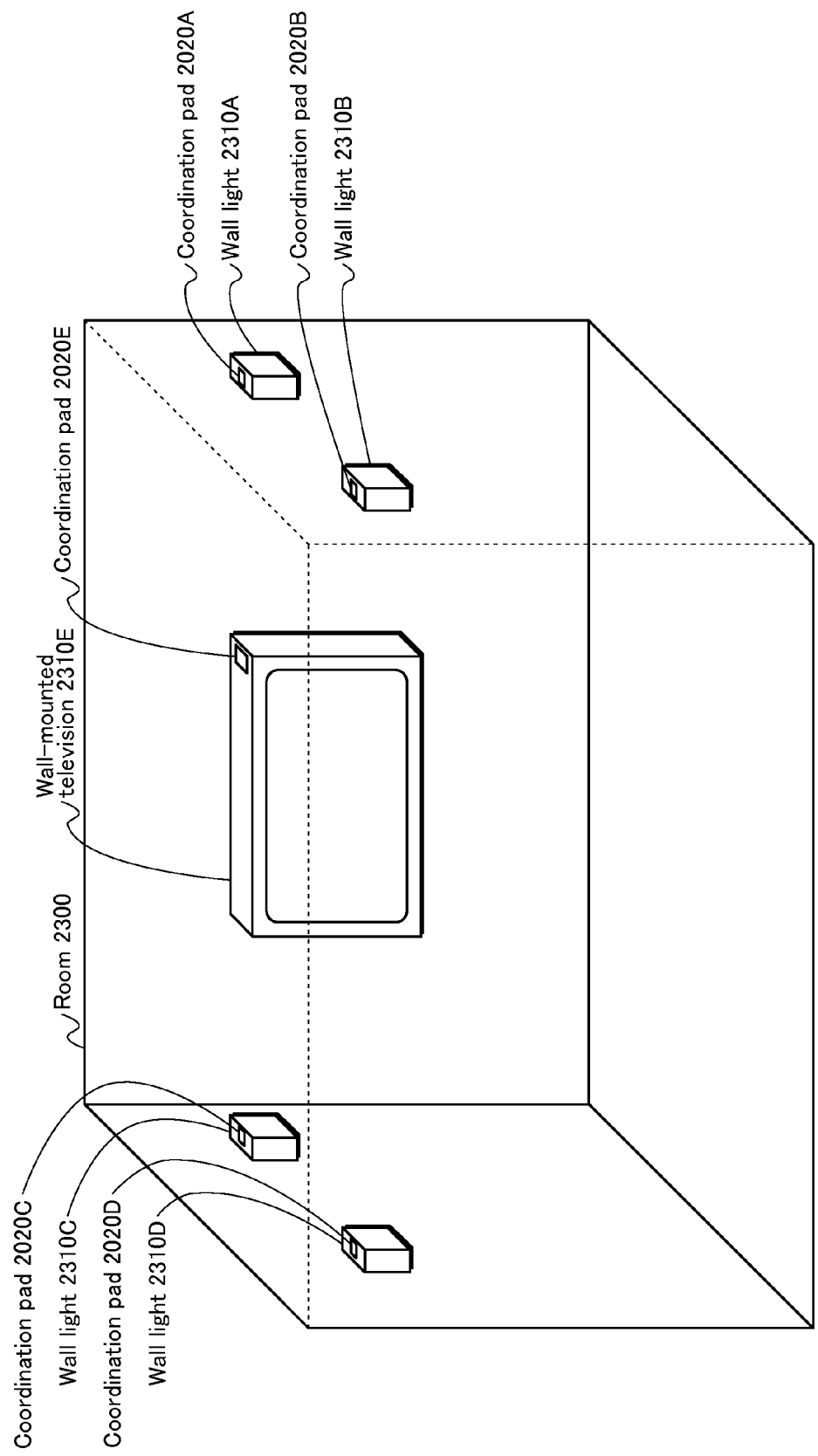
FIG. 23 is a perspective view diagram of a room 2300

FIG. 23 is a perspective diagram of a room 2300, in which wall lights 2310A-2310D and a wall-mounted television 2310E are mounted on and positioned around walls of the room 2300. Each of the wall lights 2310A, 2310B, 2310C, and 2310D, and the wail-mounted television 2310E is the device 2010. Here, to ease description, a portion of the room 2300 is illustrated as if it were transparent, but a wall of the room 2300 is not necessarily transparent.

As shown in FIG. 23, each of the wall lights 2310A, 2310B, 2310C, and 2310D is mounted and positioned on a wall of the room 2300. The front direction (the direction of illumination) of each of the wall lights 2310A, 2310B, 2310C, and 2310D is perpendicular to the wall on the wall light is mounted. Also, a respective one of coordination pads 2020A, 2020B, 2020C, and 2020D is included on an upper surface of a respective one of the wall lights 2310A, 2310B, 2310C, and 2310D. Further, a respective one of the coordination pads 2020A, 2020B, 2020C, and 2020D predefine the front direction (in FIG. 23, a direction perpendicular to a wall the wall light is mounted on) of a respective one of the wall lights 2310A, 2310B, 2310C, and 2310D as the device front direction.

The wall-mounted television 2310E is mounted and positioned on a wall of the room 2300. The front direction (the direction of displaying images) of the wall-mounted television 2310E is perpendicular to the wall on which the wall-mounted television 2310E is mounted. Also, a coordination pad 2020E is included on an upper surface of the wall-mounted television 2310E. Further, the coordination pad 2020E predefines the front direction (in FIG. 23, the direction perpendicular to the wall the wall-mounted television 2310E is mounted on) of the wall-mounted television 2310E as the device front direction, In the example illustrated by FIG. 23, when a user performs a slide action on each of the coordination pads 2020A, 2020B, 2020C, and 2020D of the wall lights 2310A, 2310B, 2310C, and 2310D in a direction of the wall-mounted television 2310E, information indicating an angle from each of the wall lights 2310A, 2310B, 2310C, and 2310D with respect to the wall-mounted television 2310E is acquired.

Figure 24:
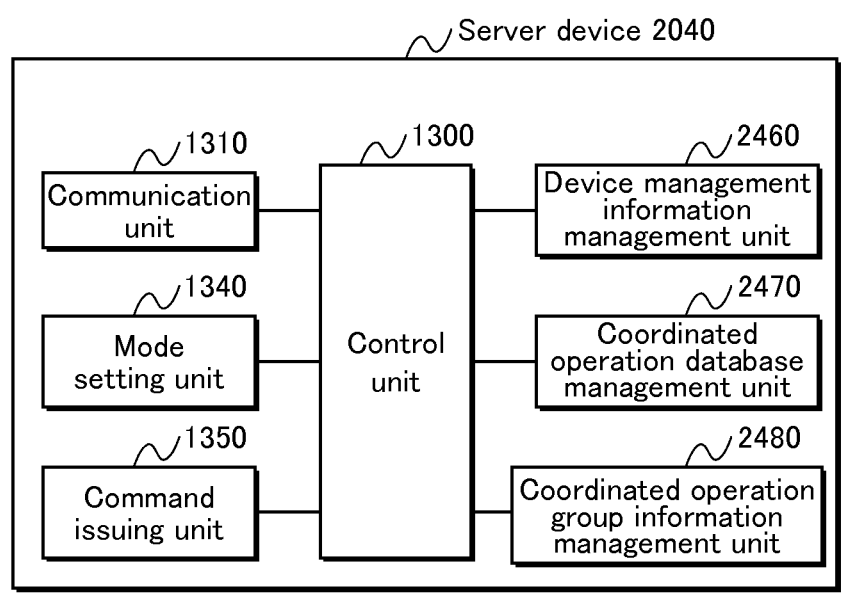
FIG. 24 is a block diagram showing function blocks of a server device 2040.

FIG. 24 is a block diagram showing function blocks of the server device 2040.

The hardware structure of the server device 2040 is the same as that of the server device 540 of embodiment 2. However, the server device 2040 is a modification of the server device 540 such that a portion of the software executed thereby, and a portion of the functions implemented, are modified from the server device 540 of embodiment 2.

As shown in FIG. 24, the server device 2040 is modified from the server device 540 of embodiment 2, such that the device management information management unit 1360 is modified to a device management information management unit 2460, the coordinated operation database management unit 1370 is modified to a coordinated operation database management unit 2470, and the coordinated operation group information management unit 1380 is modified to a coordinated operation group information management unit 2480.

The device management information management unit 2460 is modified from the device management information management unit 1360 of embodiment 2, such that conditions to update the device management information 1400 are modified. The conditions to update the device management information 1400 are described later using a flowchart, under the heading <Modified Classification Process>.

The coordinated operation database management nit 2470 is modified from the coordinated operation database management unit 1370 of embodiment 2, such that the coordinated operation database 1500 is modified to a coordinated operation database 2500.

FIG. 25 is a data structure diagram of one example of the coordinated operation database 2500 stored by the coordinated operation database management unit 2470.

As shown in FIG. 25, the coordinated operation database 2500 is modified with respect to the coordinated operation database 1500 (refer to FIG. 15) of embodiment 2, such that limiting conditions 2570 are added as an element of the coordinated operation database 2500.

Each limiting condition 2570 is information specifying a limiting condition that must be satisfied for a coordinated operation identified by a coordinated operation ID 1510 associated with the limiting condition 2570 to be performed. FIG. 25 shows an example of a limiting condition for a coordinated operation identified by a coordinated operation ID 1510 of 002. The limiting condition is that the television is positioned within an angle of plus or minus 30 degrees from the front direction of the lighting.

Returning to FIG. 24, the following continues description of the functional structure of the server device 2040.

The coordinated operation group information management unit 2480 is modified from the coordinated operation group information management unit 1380 of embodiment 2, such that conditions for updating the coordinated operation group information 1600 are modified. The conditions to update the coordinated operation group information 1600 are described later using a flowchart, under the heading <Modified Classification Process>.

Operations performed by the first modified device classification system, which has a structure as described above, are described below with reference to the drawings.

<Operations>

In addition to the coordination process of embodiment 2, the first modified device classification system performs the modified classification process as an operation that characterizes the first modified device classification system. In the modified classification process a portion of the classification process of embodiment 2 is modified.

The following is a description of the modified classification process.

<Modified Classification Process>

The modified classification process is a process performed by the first modified device classification system. The modified classification process is a process in which devices 2010 specified by a user who uses the first modified device classification system are classified as belonging to a new coordinated operation group. Here, description is given focusing on differences between the modified classification process and the classification process of embodiment 2.

Figure 26:
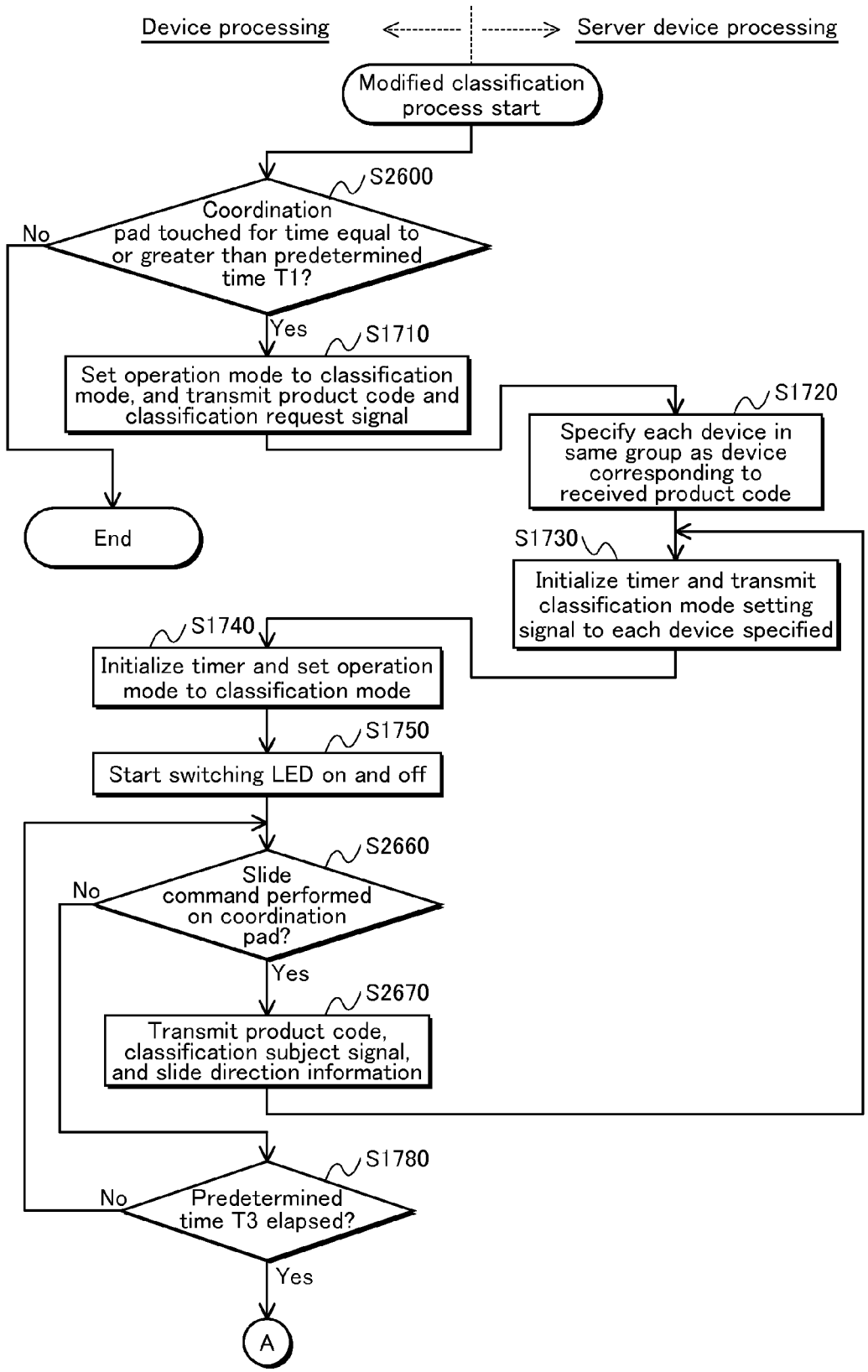
FIG. 26 is part 1 of a flowchart of a modified classification process.
Figure 27:
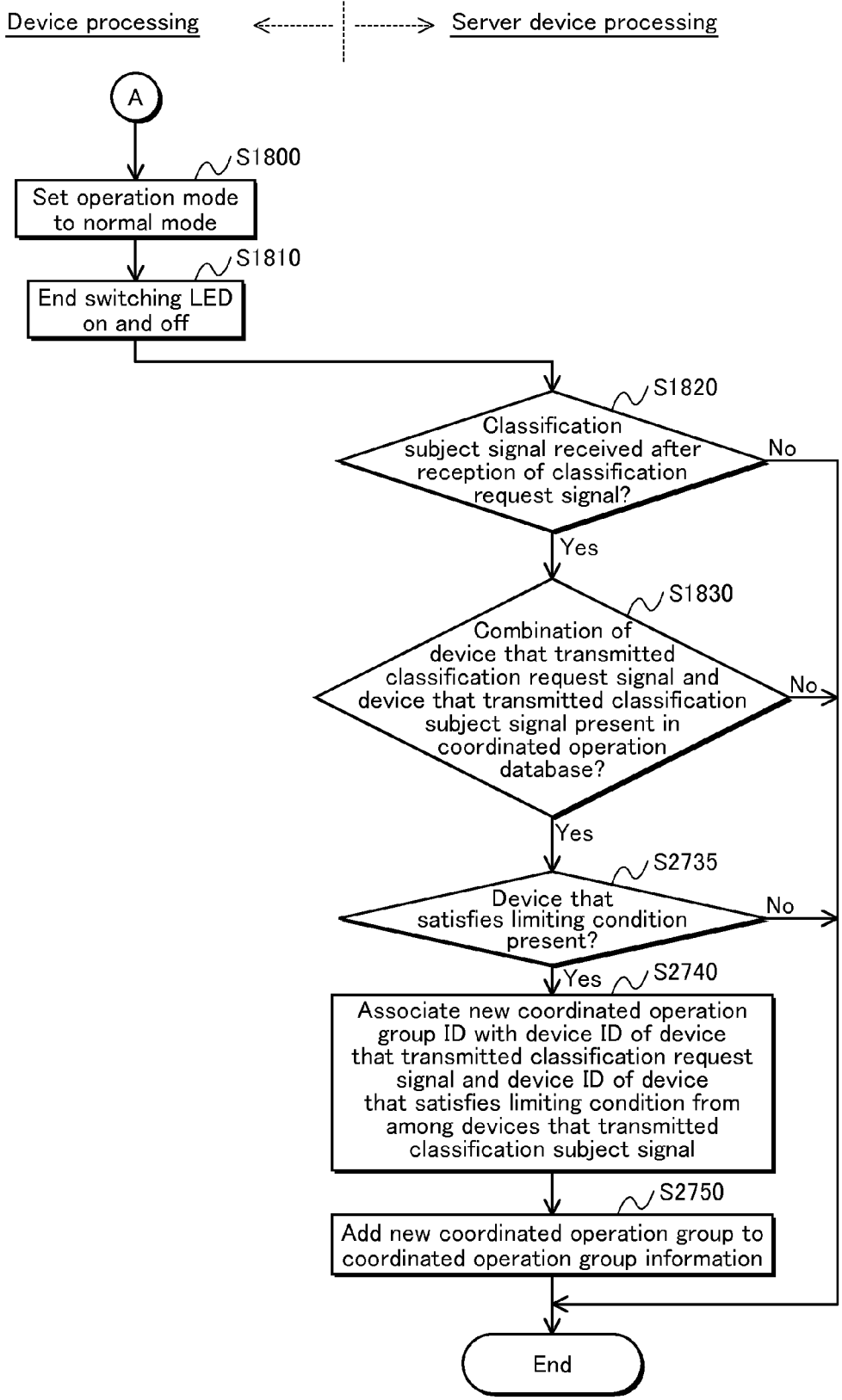
FIG. 27 is part 2 of the flowchart of the modified classification process.

FIG. 26 and FIG. 27 are a flowchart of the modified classification process.

As shown in FIG. 26 and FIG. 27, the modified classification process is modified from the classification process of embodiment 2, such that step S1700 is modified to step S2600, step S1760 is modified to step S2660, step S1770 is modified to step S2670, step S2735 is added, step S1840 is modified to step S2740, and step S1850 is modified to step S2750.

The modified classification process is started by the performing of the touch action on the coordination pad 2020 of a device 2010, whose operation mode is the normal mode.

When the modified classification process is started, the mode setting unit 770 uses the timer 625 to measure a duration for which the coordination pad 2020 is touched, and checks whether or not the duration for which the coordination pad 2020 is touched is equal to or greater than the predetermined time T1 (for example, three seconds) (step S2600).

If the duration for which the coordination pad 2020 is touched is equal to or greater than the predetermined time T1 in step S2600 ("Yes" in step S2600), the first modified classification system performs step S1710 to step S1750.

When the switching on and off of the LED 630 is started in the processing of step S1750, the input unit 2210 waits for the slide action to be performed on the coordination pad 2020 during the period of the predetermined time T3 measured by the timer 625 ("No" at step S2660 and "No" at step S1780 are repeated).

If the slide action is performed on the coordination pad 2020 during the period of the predetermined time T3 measured by the timer 625 ("Yes" at step S2660 after repeating "No" at step S2660 and "No" at step S1780), the input unit 2210 acquires slide direction information, and transmits, by using the communication unit 740, a classification subject signal, the product code of the device 2010, and the slide direction information so acquired to the server device 2040 (step S2670). The classification subject signal indicates a request to the server device 2040 to classify the device 2010 as belonging to the new coordinated operation group. The product code is stored in the device information storage unit 760.

When step S2670 is completed, the first modified device classification system returns to step S1730, and repeats the process from step S1730.

If the slide action is not performed on the coordination pad 2020 during the period of the predetermined time T3 measured by the timer 625 ("Yes" at step S1780 after repeating "No" at step S2660 and "No" at step S1780), the first modified device classification system performs step S1800 to step S1830.

If the combination of the device type of the device 2010 transmitting the classification request signal and the device type of the device 2010 transmitting the classification subject signal is present in step S1830 ("Yes" in step S1830), the coordinated operation database management unit 2470 checks whether or not a device that satisfies a limiting condition 2570 of the coordinated operation associated with that combination is present among devices transmitting the classification subject signal (step S2735).

If a device 2010 that satisfies the limiting condition 2570 is present among the devices transmitting the classification request signal in step S2735 ("Yes" in step S2735), the device management information management unit 2460 updates the device management information 1400 by associating a new coordinated operation group ID 1450 with the device ID 1410 of the device 2010 transmitting the classification request signal and the device ID 1410 of each device 2010 that satisfies the limiting condition 2570 among the devices transmitting the classification subject signal (step S2740). Next, the coordinated operation group information management unit 2480 references the coordinated operation database 2500 stored in the coordinated operation database management unit 2470, and updates the coordinated operation group information 1600 by adding a new coordinated operation group (step S2750). The new coordinated operation group is added by associating, with the new coordinated operation group ID 1450 that is associated with the device ID 1410 of the device 2010 transmitting the classification request signal, the device ID 1410 of the at least one device 2010 that satisfies the limiting condition 2570 among the devices transmitting the classification subject signal, a processing order 1520, a device type 1530, and a trigger flag 1540 (step S2750).

The first modified device classification system ends the modified classification process when any of the following occur: (i) In step S2600 (refer to FIG. 26), the duration for which the coordination pad 2020 is touched is not equal to or greater than the predetermined time T1 ("No" at step S1700); (ii) in step S1820, a classification subject signal is not received after the classification request signal is received ("No" at step S1820), (iii) in step S1830, a combination of the device type of the device 2010 transmitting the classification request signal and the device type of the device 2010 transmitting the classification subject signal is not present ("No" at step S1830); in step S2735, a device that satisfies the limiting condition 2570 is not present among the devices transmitting the classification subject signal ("No" at step S2735); or (iv) after step S1850 finishes.

The specific operations of step S2735 and step S2740 of the modified classification process described above are described below using specific examples.

Here, a specific example is described in which the coordinated operation database stored by the coordinated operation database management unit 2470 is the coordinated operation database 2500 illustrated in FIG. 25. In this example, from among the wall-mounted television 2310E and the wall lights 2310A, 23109, 2310C, and 2310D positioned in the room 2300 and illustrated in FIG. 23, a user intends to classify a group of devices that satisfy a limiting condition for a coordinated operation to be performed, as belonging to a new coordinated operation group.

In this example, the direction of the wall-mounted television 2310E is considered to be approximately 20 degrees from the front direction of the wall light 2310A, approximately 20 degrees from the front direction of the wall light 2310C, approximately 40 degrees from the front direction of the wall light 23109, and approximately 40 degrees from the front direction of the wall light 2310D.

Further, in this example, when the modified classification process is started, in step S2600 the coordination pad 2020E of the wall-mounted television 2310E is touched by the user for a time equal to or greater than the predetermined time T1. Subsequently, in step S2660 the slide action is performed by the user on the coordination pads 2020A, 20209, 2020C, and 2020D of the respective wall lights 2310A, 23109, 2310C, and 2310D, in the direction of the wall-mounted television 2310E.

Based on the above-described situation, when step S2735 is started, the coordinated operation database management unit 2470 references the slide direction information transmitted from the wall tights 2310A, 2310B, 2310C, and 2310D. In the above-described situation, with respect to the front direction of the lighting, the wall-mounted television 2310E is positioned at 20 degrees from the wall light 2310A and the wall light 2310C, and at 40 degrees from the wall light 23109 and the wall light 2310D. Thus, the coordinated operation database management unit 2470 judges that, among the devices transmitting the classification subject signal, a device 2010 that satisfies the limiting condition 2570 is present (the wall light 2310A and the wall light 2310C are devices that satisfy the limiting condition ("Yes" in step S2735).

Next, in step S2740, the device management information management unit 2460 updates the device management information 1400 by associating the device ID 1410 of the wall-mounted television 2310E transmitting the classification request signal, and the device IDs 1410 of the wall light 2310A and the wall light 2310C that satisfy the limiting condition 2570 from among the wall lights 2310A-2310D, with a new coordinated operation group ID 1450.

Further, in step S2750, the coordinated operation group information management unit 2480 references the coordinated operation database 2500 stored in the coordinated operation database management unit 2470, and updates the coordinated operation group information 1600 by adding a new coordinated operation group (step S2750). The new coordinated operation group is added by associating, with the new coordinated operation group ID 1450, the device ID 1410 of the wall-mounted television 2310E transmitting the classification request signal, the device ID 1410 of the wall light 2310A and the device ID 1410 of the wall light 2310C that satisfy the limiting condition 2570 from among the wall lights 2310A-2310D transmitting the classification subject signal, a processing order 1520, a device type 1530 for each device type, and a trigger flag 1540 for each device type.

<Embodiment 4>
<Summary>

The following describes a second modified device classification system, in which a portion of the device classification system 500 of embodiment 2 is modified, as an embodiment of a device control method pertaining to the present invention.

In the second modified device classification system, each device that is part of the system, when performing an operation, transmits to the server device an operation information signal that includes the time of the operation, the product code of the device, an IP address of the home gateway that the device communicates with, and information specifying the operation.

The server device receives the operation information signal, and stores an operation history of each device that is part of the system.

Also, when the server device receives the operation information signal from a given device, the server device references the operation history stored by the server device, and checks whether or not the IP address included in the operation information signal matches the IP address included in the previous operation information signal received from the device.

Then, if the IP addresses do not match, the server device causes each device identified by a device ID 1410 that is associated with a specific IP address to check the IP address of the home gateway that the device is currently communicating with. Here, the specific IP address is, in the device management information 1400 stored by the server device, an IP address that is the same as the IP address 1430 associated with the device ID 1410 that identifies the device transmitting the operation information signal.

Further, the server device checks, from among such devices, whether or not a device is present that reports an IP address that does not match the IP address included in the previous operation information signal transmitted by the device.

Then, if a device that reports a non-matching IP address is present, the server device transmits a non-match signal to the device, indicating that the current IP address and the previous IP address do not match.

A device that receives the non-match signal notifies the user using the device that the IP address of the home gateway that the device communicates with has been changed.

The following describes details of the second modified device classification system, given with reference to the drawings and focusing on differences from the device classification system 500 of embodiment 2.

<Structure>

The second modified device classification system is modified from the device classification system 500 of embodiment 2, such that the device 510 is modified to a device 2810, and the server device 540 is modified to a server device 2840.

The following is a description of the device 2810 and the server device 2840.

Figure 28:
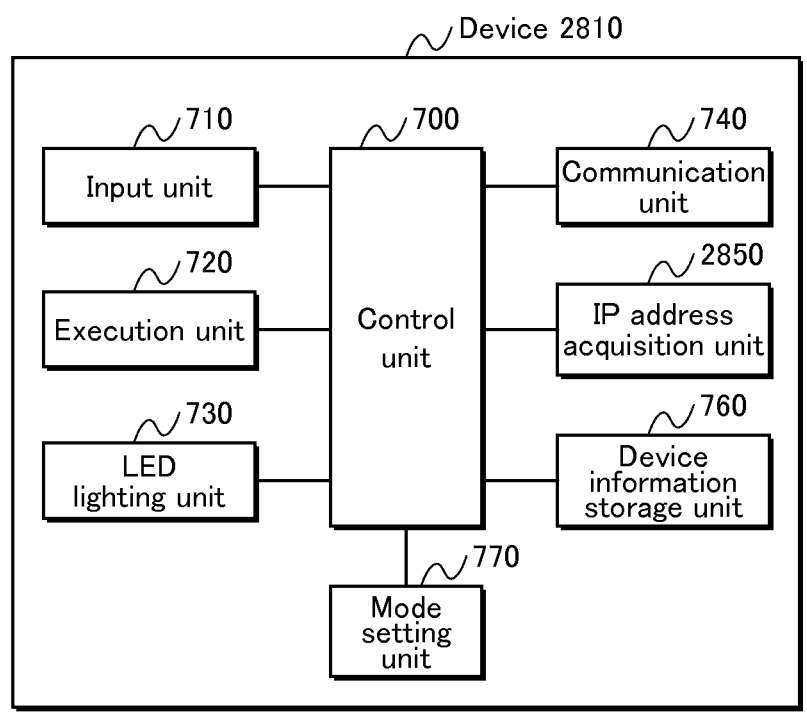
FIG. 28 is a block diagram showing function blocks of a device 2810.

FIG. 28 is a block diagram showing function blocks of the device 2810.

The hardware structure of the device 2810 is the same as that of the device 510 of embodiment 2. However, the device 2810 is a modification of the device 510 in that a portion of the software executed thereby, and a portion of the functions implemented, are modified from the device 510 of embodiment 2.

As shown in FIG. 28, the device 2810 is modified from the device 510 of embodiment 2, such that the IP address acquisition unit 750 is modified to an IP address acquisition unit 2850.

The IP address acquisition unit 2850 in a given device 2810 has, in addition to the functions of the IP address acquisition unit 750 in embodiment 2, the following two functions performed using the communication unit 740 when an operation is performed by the device 2810. Function (1) is acquiring, from the home gateway that communicates with the communication unit 740, an IP address that is assigned to the home gateway 520 when the home gateway 520 is connected to the network 550. Function (2) is transmitting, to the server device 2840, the operation information signal that includes the time the operation was performed, the product code of the device 2810, which is stored by the device information storage unit 760, the IP address acquired, and information specifying the operation.

Figure 29:
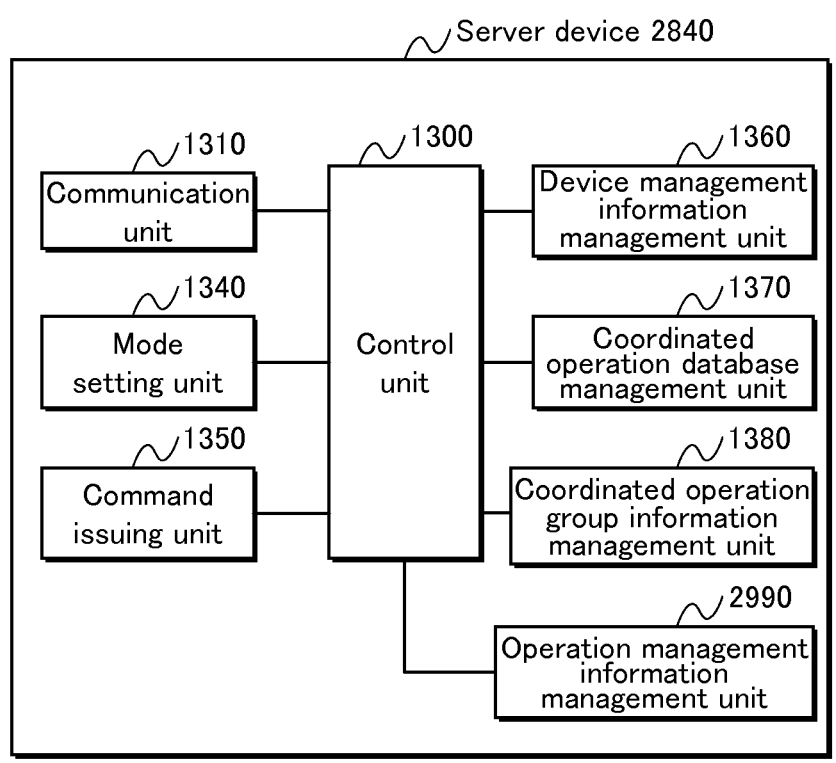
FIG. 29 is a block diagram showing function blocks of a server device 2840.

FIG. 29 is a block diagram showing function blocks of the server device 2840.

The hardware structure of the server device 2840 is the same as that of the server device 540 of embodiment 2. However, the server device 2840 is a modification of the server device 540 in that a portion of the software executed thereby, and a portion of the functions implemented, are modified from the server device 540 of embodiment 2.

As shown in FIG. 29, the server device 2840 is modified from the server device 540 of embodiment 2, such that an operation management information management unit 2990 is added.

The operation management information management unit 2990 is implemented by the CPU 1200 executing a program, and a part of the storage area included in the hard disk drive 1250. The operation and information management unit 2990 has a function of storing operation management information 3000, and of updating the operation management information 3000.

FIG. 30 is a data structure diagram showing one example of the operation management information 3000 stored by the operation management information management unit 2990.

As shown in FIG. 30, the operation management information 3000 includes times 3010, device IDs 3020, IP addresses 3030, and operations 3040. A time 3010, a device ID 3020, an IP address 3030, and an operation 3040 are associated with each other.

The operation management information 3000 is information that indicates the operation history of the device 2810 included in the second modified device classification system. The operation management information 3000 is updated as required, by the operation management information management unit 2990.

Each time 3010 is information that indicates when an operation specified by the associated operation 3040 is performed by a device 2810 identified by the associated device ID 3020.

Each device ID 3020 is an identifier that identifies a device 2810 included in the second modified device classification system.

Each IP address 3030 is an IP address of the home gateway 520 that communicates with a device 2810 that is identified by an associated device ID 3020.

Each operation 3040 is information that specifies an operation performed by a device 2810 that is identified by an associated device ID 3020, at a time indicated by an associated time 3010.

Operations performed by the second modified device classification system, which has a structure as described above, are described below with reference to the drawings.

<Operations>

The second modified device classification system performs an operation management information update process as an operation that characterizes the second modified device classification system, in addition to the classification process and the coordination process of embodiment 2.

The following is a description of the operation management information update process.

<Operation Management Information Update Process>

The operation management information update process is a process performed by the second modified device classification system. The operation management information update process is a process in which the server device 2840 updates the operation management information 3000 stored by the server device 2840 when a device 2810 included in the second modified device classification system performs an operation. According to this process, when an IP address of a home gateway 520 that communicates with a device 2810 performing an operation (hereafter, "device A") has been changed, the server device 2840 references the device management information 1400 stored by the server device 2840, and checks, for each device 2810 associated with the home gateway 520 that had communicated with the device A prior to the IP address being changed, whether or not the address of the home gateway 520 that communicates with a given device has been changed.

Figure 31:
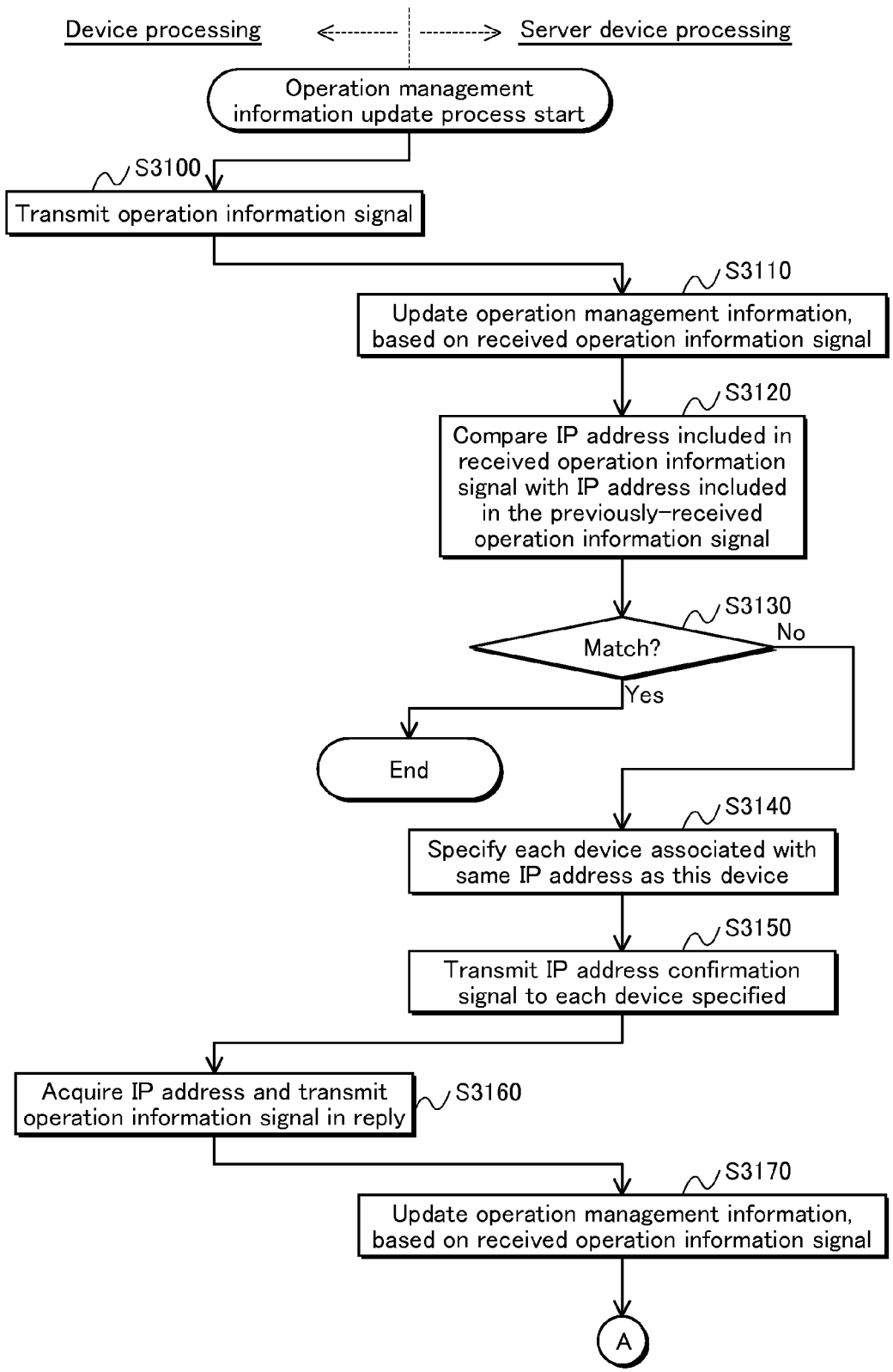
FIG. 31 is part 1 of a flowchart of an operation management information update process.
Figure 32:
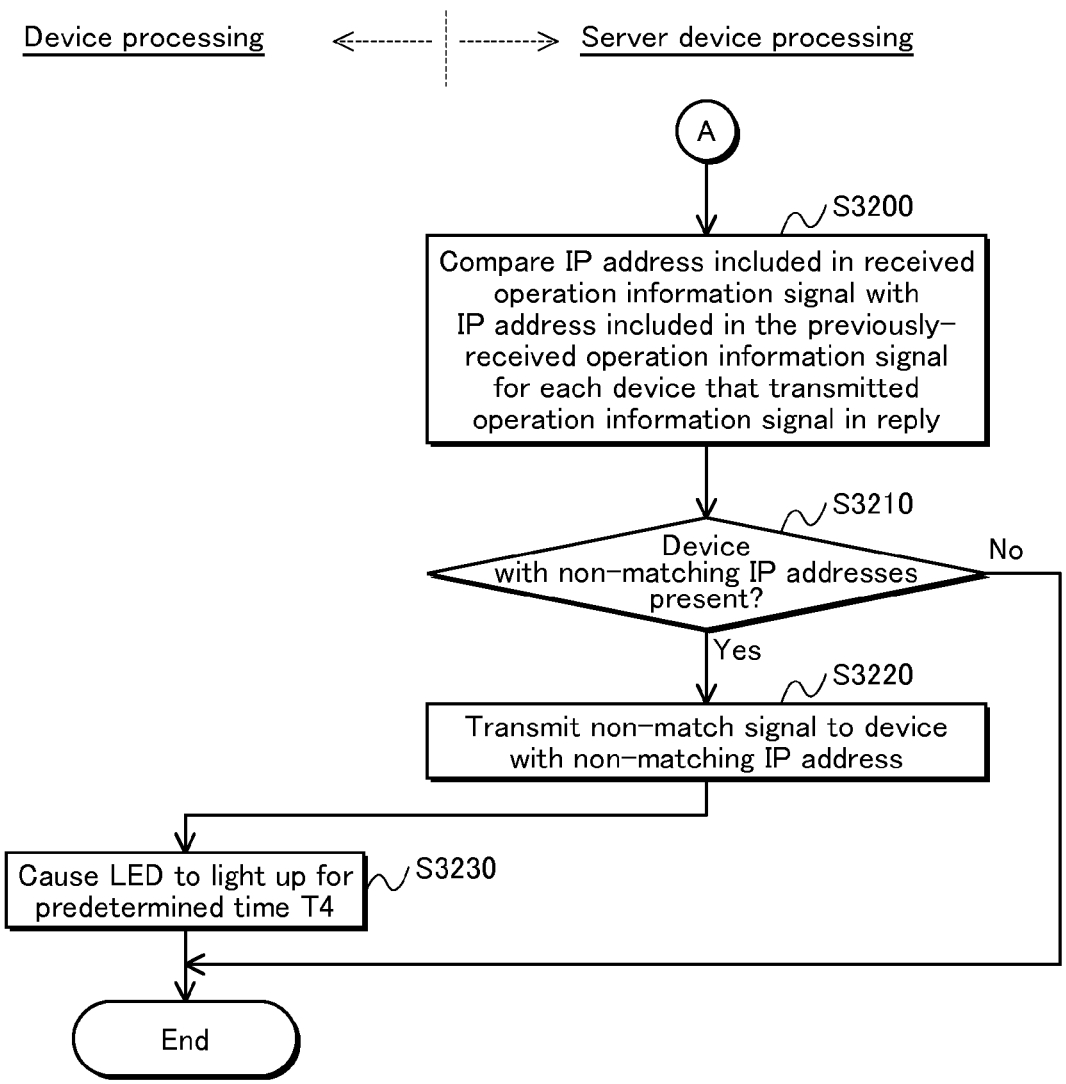
FIG. 32 is part 2 of the flowchart of the operation management information update process.

FIG. 31 and FIG. 32 are a flowchart of the operation management information update process.

The operation management information update process is started by the performance of an operation by a device 2810 included in the second modified device classification system.

When the operation management information update process is started, the IP address acquisition unit 2850 of the device 2810 performing an operation uses the communication unit 740 to (1) acquire, from the home gateway 520 that communicates with the communication unit 740, the IP address that is assigned to the home gateway 520 when the home gateway 520 is connected to the network 550, and (2) transmit, to the server device 2840, the operation information signal that includes the time the operation was performed, the product code of the device that is stored by the device information storage unit 760, the IP address acquired, and information specifying the operation (step S3100).

When the communication unit 1310 of the server device 2840 receives the operation information signal, the operation management information management unit 2990 updates the operation management information 3000 stored by the server device 2840, based on the operation information signal (step S3110).

When the operation management information 3000 is updated, the operation management information management unit 2990 references the operation management information 3000 regarding the device 2810 transmitting the operation information signal, and compares the IP address included in the received operation information signal and the IP address included in the previous received operation information signal (step S3120).

When the result of the comparison is that the IP address included in the received operation information signal and the IP address included in the previous received operation information signal do not match ("No" in step S3130), the operation management information management unit 2990 references the device management information 1400 stored in the device management information management unit 1360, and specifies each device 2810 identified by a device ID 1410 that is associated with the same IP address 1430 as the IP address 1430 of the device 2810 transmitting the operation information signal (step S3140). Then, the operation management information management unit 2990 uses the communication unit 1310 to transmit an IP address confirmation signal to each specified device 2810 (step S3150). The IP address confirmation signal indicates that the specified device 2810 is to generate an operation information signal by acquiring an IP address from the home gateway 520 that communicates with the device 2810, and transmit the generated operation information signal to the server device 2840.

In each device 2810 that receives the IP address confirmation signal, when the communication unit 740 receives the IP address confirmation signal, the IP address acquisition unit 2850 uses the communication unit 740 to (1) acquire, from the home gateway 520 that communicates with the communication unit 740, the IP address that is assigned to the home gateway 520 when the home gateway 520 is connected to the network 550, and (2) transmit, to the server device 2840, the operation information signal that includes the time the IP address confirmation signal was received, the product code of the device 2810 that is stored by the device information storage unit 760, the IP address acquired, and information specifying the operation (which is receiving the UP address confirmation signal) (step S3160).

When the communication unit 1310 of the server device 2840 receives the operation information signal from a device 2810 having been sent the IP address confirmation signal, the operation management information management unit 2990 updates the operation management information 3000 stored by the server device 2840, based on the operation information signal (step S3170).

When the operation management information 3000 is updated, for each device 2810 transmitting the operation information signal, the operation management information management unit 2990 references the operation management information 3000 and compares the IP address included in the received operation information signal and the IP address included in the previous received operation information signal (step S3200).

If the result of the comparison is that a device is present for which the IP address included in the transmitted operation information signal and the IP address included in the previous transmitted operation information signal do not match ("Yes" in step S3210), the operation management information management unit 2990 uses the communication unit 1310 to transmit a non-match signal to each such device 2810 (step S3220).

In each device 2810 that receives the non-match signal, when the communication unit 740 receives the non-match signal, the IP address acquisition unit 2850 uses the LED lighting unit 730 to cause the LED 630 to light up for a predetermined time T4 (for example, one hour) (step S3230). Thus, a user who uses a device 2810 that receives the non-match signal is notified that the IP address of the home gateway 520 that communicates with the device 2810 has been changed.

<Supplement>

Above, as embodiments of the device classification method pertaining to the present invention, a description is given using the examples of one terminal control system and three device classification systems in embodiment 1, embodiment 2, embodiment 3, and embodiment 4. However, modifications such those described below are possible, and the present invention is not limited to the terminal control method used in the terminal control system or the device classification systems as described above in embodiment 1, embodiment 2, embodiment 3, and embodiment 4.

(1) In embodiment 2, the device 510 is described as including the LED 630 that switches on and off according to the predetermined pattern. However, as long as the device 510 includes a device that can perform a predetermined notification to a user thereof, the device 510 need not include the LED 630 that switches on and off according to the predetermined pattern. As one example, the device 510 may include a speaker that emits a predetermined sound.

(2) In embodiment 2, the device 510 and the home gateway 520 are described as performing communications according to the Bluetooth standard. However, as long as the device 510 and the home gateway 520 are able to communicate with each other, communication according to the Bluetooth standard is not required. As one example, the device 510 and the home gateway 520 may perform infrared communication. Further, as another example, the device 510 and the home gateway 520 may perform power line communication by using power lines that connect the device 510 and the home gateway 520.

(3) in embodiment 2, the device 510 and the server device 540 are described as communicating via the home gateway 520. However, as long as the device 510 and the server device 540 are able to communicate with each other, communication via the home gateway 520 is not required. As one example, the device 510 and the server device 540 may communicate by using a commercial mobile phone communication line. In such a case, the home gateway 520 is not required as an element of the device classification system 500.

(4) In embodiment 2, step S1700 is a process of checking whether or not the coordination button 620 is pressed for a time equal to or greater than the predetermined time T1. However, as long as a process is performed of checking whether or not an action is performed on the device 510 that causes execution of transmission of the classification request signal to the server device 540, the process need not be checking whether or not the coordination button 620 is pressed for a time equal to or greater than the predetermined time T1. As one example, a process may be performed of checking whether or not the coordination button 620 is pressed a predetermined number of times in a predetermined rhythm. In such a case, the action to the device 510 that causes execution of transmission of the classification request signal to the server device 540 is the action of pressing the coordination button 620 the predetermined number of times in the predetermined rhythm, as mentioned above.

(5) In embodiment 2, step S1900 is a process of checking whether or not the coordination button 620 is pressed twice in succession before the predetermined time T1 elapses. However, as long as a process is performed of checking whether or not an action is performed on the device 510 that causes execution of transmission of the coordinated operation request signal to the server device 540, the process need not be checking whether or not the coordination button 620 is pressed twice in succession before the predetermined time T1 elapses. As one example, a process may be performed of checking whether or not the coordination button 620 is pressed a predetermined number of times in a predetermined rhythm. In such a case, the action performed on the device 510 that causes execution of transmission of the coordinated operation request signal to the server device 540 is the action of pressing the coordination button 620 the predetermined number of times in the predetermined rhythm, as mentioned above.

(6) In embodiment 2, the coordinated operation database 1500 (refer to FIG. 15) includes the trigger flags 1540, and one device type 1530 is described as not being associated with multiple trigger flags 1540 that have a logical value of "1". However, as long as the coordinated operation started by one device type 1530 is uniquely determinable, the coordinated operation database 1500 need not include the trigger flags 1540. As one example, the coordinated operation database 1500 may be configured such that multiples of the same device type 1530 are not included in the coordinated operation database 1500. In such a case, regardless of the device type 1530, a device classified as belonging to a coordinated operation group is able to start the coordinated operation performed by the coordinated operation group. Further, in such a case, step S1930 in the coordination process (refer to FIG. 19) is not required.

Further, as long as the coordinated operation started by one device type 1530 is definitely determined to be unique, the coordinated operation database 1500 may associate a given device type 1530 with multiple trigger flags 1540 that have a logical value of "1". As one example, in a case in which multiple trigger flags 1540 that have a logical value of "1" are associated with a given device type 1530, the coordinated operation database 1500 may include information (hereafter, "coordinated operation specification information") for uniquely specifying which coordinated operation can be started by which device type 1530. In such a case, by using the coordinated operation specification information, the coordinated operation that can be started by a given device type 1530 is uniquely specified.

(7) In embodiment 2, the device 510, the home gateway 520, and the server device 540 are described as having structures illustrated by FIG. 7, FIG. 11, and FIG. 13, respectively. However, as long as a combination of the device 510, the home gateway 520, and the server device 540 implements the same functions as the device classification system 500, the device 510, the home gateway 520, and the server device 540 need not have the structures illustrated by FIG. 7, FIG. 11, and FIG. 13, respectively. As one example, a portion of the functions implemented by the server device 540 may be distributed across and implemented by a plurality of home gateways 520. As another example, a portion of the functions implemented by the server device 540 may be distributed across and implemented by a plurality of devices 510.

(8) In embodiment 2, the device 510, the home gateway 520, and the server device 540 are described as having circuit structures illustrated by FIG. 6, FIG. 10, and FIG. 12, respectively. In contrast, a portion or all of the elements of each of the device 510, the home gateway 520, and the server device 540 may be formed by a removable integrated circuit (IC) card and/or a removable module. Such an IC card or module is a computer system that includes a microprocessor, ROM, RAM, etc. Such an IC card or module may include a super multifunction LSI. The microprocessor operates according to a computer program, and such an IC card and/or module thereby accomplishes its functions. Such an IC card and/or module may be tamper resistant.

(9) In embodiment 2, in the device management information 1400, a device ID 1410, a product code 1420, an IP address 1430, a group ID 1440, and a coordinated operation group ID 1450 are described as being associated with each other. Alternatively, as a different example, in addition to such elements, information specifying access permissions to use each service provided by the device classification system 500 may further be associated with such elements. Further, a plurality of services may be made available to a single coordinated operation group the device classification system 500. In such a way, even one coordinated operation group can benefit from a variety of services provided by the device classification system 500.

(10) In embodiment 2, the device 510 is described as having the coordination button 620. Alternatively, as a different example, the device 510 may have a button (for example, a cancel button, etc., hereafter called a "multi-function button") for implementing another function, to which the function of the coordination button 620 is also assigned, without including the coordination button 620. In such a case, for example, in the classification process (refer to FIG. 17), when the multi-function button is pressed of a device 510 whose operation mode is the normal mode, if the multi-function button is not pressed for a time equal to or greater than the predetermined time T1 ("No" in step S1700), the device 510 performs processing for implementing the other function.

(11) In embodiment 3, the input device 2015 is described as including the coordination pad 2020, which is composed of the touch pad that has the function of receiving the slide action from a user. However, as long as the input device 2015 is a device that can acquire information indicating the position of the device 2010 that includes the input device 2015 relative to other devices 2010, the input device 2015 need not include the coordination pad 2020, which includes a touch pad 2010. As one example, the input device 2015 may include an input device 3300 described below.

Figure 33:
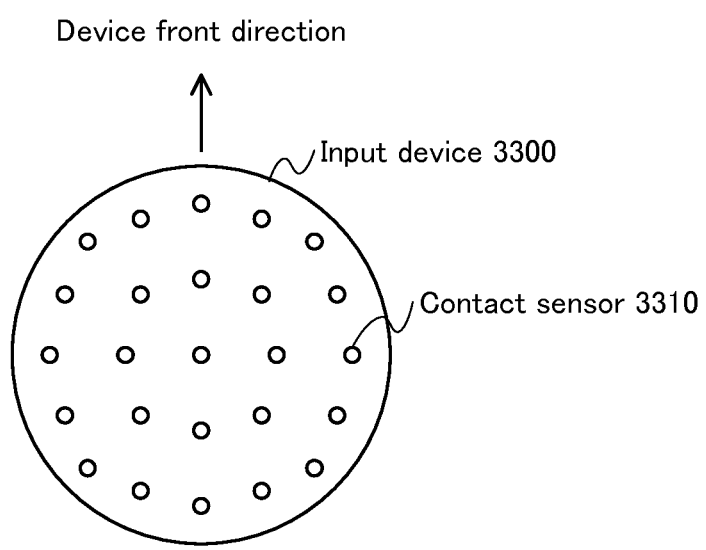
FIG. 33 is a schematic diagram showing an exterior of an input device 3300.

FIG. 33 is a schematic diagram showing an exterior of the input device 3300

As shown in FIG. 33, the input device 3300 includes, on a main surface thereof, a plurality of touch sensors 3310 that sense contact from a finger, etc., of a user. If a slide action is performed on the main surface of the input device 3300 by a finger, etc., of a user, the input device 3300 detects an angle between a predetermined direction (here, the device front direction) and a direction in which the touch sensors 3310 that have sensed contact from the finger, etc., that performed the slide action are lined up.

Further, as a different example, the input device 2015 may include a keyboard by which information that indicates a position of a device 2010 that includes the input device 2015 relative to other devices 2010 may be directly entered.

(12) In embodiment 3, the device management information 1400 stored in the device management information management unit 2460 is described as not including information pertaining to the slide direction information that is transmitted from the device 2010. Alternatively, as a different example, when the server device 2840 receives slide direction information transmitted from the device 2010, the device management information management unit 2460 may update device management information 3400 (detailed later) to include information pertaining to the slide direction information. In this example, when classifying a plurality of the devices 2010 as belonging to anew coordination operation group, when a user is performing, in order, a slide action on the coordination pad 2020 of each device 2010 that is to be classified, the slide action on a given device 2010 is performed in the direction of the device 2010 on which the slide action is to be performed next.

FIG. 34 is, in the above example of modification, a data structure diagram showing one example of the device management information 3400 stored by the device management information management unit 2460.

As shown in FIG. 34, the device management information 3400 is modified from the device management information 1400 (refer to FIG. 14) of embodiment 3, in that device directions 3410 and sets of device relative coordinates 3420 are added.

A device direction 3410 is associated with a device ID 1410 that identifies a device 2010 and a coordinated operation group ID 1450 that identifies a coordinated operation group. Each device direction 3410 is information that specifies a direction of a device 2010 on which an action is to be performed next, relative to a device 2010 that is identified by an associated device ID 1410, in a sequence of actions for classifying the device identified by the associated device ID 1410 as belonging to a coordinated operation group identified by an associated coordinated operation group ID.

Each set of the device relative coordinates 3420 is associated with a coordinated operation group ID 1450 that identifies a coordinated operation group and with a device ID 1410 that identifies a device 2010. A set of device relative coordinates 3420 includes relative coordinates of a device 2010 that is identified by an associated device ID 1410 in a coordinated operation group that is identified by an associated coordinated operation group ID 1450.

In the above example, when classifying a plurality of the devices 2010 as belonging to a new coordination operation group, when a user is performing, in order, a slide action on the coordination pad 2020 of each device 2010 that is to be classified, the slide action on a given device 2010 is performed in the direction of the device 2010 on which the slide action is to be performed next. When the slide action is performed as described above, each device 2010 that is to be classified transmits to the server device 2040 slide action information that indicates a direction of the device 2010 on which the slide action is to be performed next. Thus, the device management information management unit 2460 of the server device 2040 updates the device direction 3410 of the device management information 3400 that is stored on the server device 2040, based on the slide direction information received.

Further, when classification is being performed by a user as described above, when the server device 2040 first receives slide direction information transmitted together with the classification request signal, the device management information management unit 2460 updates the device management information 3400, such that the device relative coordinates 3420 of the device 2010 transmitting the slide direction information are set as (0, 0, 0). Afterward, when the server device 2040 receives the slide direction information transmitted together with the classification subject signal, the device and information management unit 2460 updates the device management information 3400 by calculating the device relative coordinates 3420 of the device 2010 transmitting the classification subject signal. The device relative coordinates 3420 of the device 2010 transmitting the classification subject signal are relative to the device relative coordinates 3420 that were updated immediately before, and are calculated taking into consideration the direction of the device 2010 indicated by the previously received slide direction information.

For example, in a case in which the direction indicated by the previously received slide direction information is "upper right", new device relative coordinates 3420 are calculated by adding (0, 1, 1) to the value of the device relative coordinates 3420 of the previous device.

As shown in this example, in the device classification system, when as the server device stores information regarding the relative positions of the devices that are classified as belonging to a coordinated device group, the device classification system can implement management of the devices by using such information.

(13) in embodiment 2, the function blocks of each of the device 510, the home gateway 520, and the server device 540 may be implemented by an LSI. Each of the function blocks may be made into one chip individually, or may also be made into one chip so as to include at least one unit or to include a part of each unit.

The LSI may be referred to as an integrated circuit (IC), a system LSI, a super LSI or an ultra LSI in accordance with the degree of integration.

In addition, an integrated circuit may not necessarily be manufactured as an LSI, but may be realized by a dedicated circuit or a general-purpose processor. A field programmable gate array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSI emerges, owing to advances in semiconductor technology or to another derivative technology, the integration of functional blocks may of course be accomplished using such technology.

Each of the function blocks may also be realized as software, or alternatively, as a combination of an LSI and software. Also, such software may be made tamper-resistant.

(14) The method described above may be implemented by a computer program that is used by a computer system, and may be implemented by a digital signal that is used by a computer system.

Further, the above-mentioned computer program and/or digital signal may be recorded on a computer-readable medium such as a floppy disk, a hard drive, a GD-ROM; an MO, a DVD, a DVD-ROM, a DVD-RAM, a Blu-ray Disc™ (BD), a semiconductor memory, etc.

Further, the above-mentioned computer program and/or digital signal may be transmitted via a telecommunication line, a wireless or a wired communication tine, a network typified by the internet, a data broadcast, etc.

Further, the above-mentioned computer program and/or digital signal may, by being recorded on an above-described recording medium and transferred, and/or by being transferred via a network, etc., be implemented by another independent computer system.

(15) The above-described embodiments and modifications may be combined with one another.

(16) The following further describes effects of a device classification method pertaining to one aspect of the present invention and modifications thereof, effects of a device classification system pertaining to one aspect of the present invention, and structure and effects of a device pertaining to one aspect of the present invention.

(a) The device classification method pertaining to one aspect of the present invention is a device classification method of a device classification system that classifies devices in a device group composed of a plurality of devices associated with each other as belonging to a coordinated operation group, devices classified as belonging to the coordinated operation group operating in coordination with each other, the device classification method comprising: receiving a first action performed on a first device in the device group, for classifying the first device as belonging to the coordinated operation group; setting, when the first action is received, each of one or more devices in the device group other than the first device to a classifiable state in which the device is classifiable as belonging to the coordinated operation group; receiving a second action performed on a second device in the device group that is set to the classifiable state, for classifying the second device as belonging to the coordinated operation group; and classifying, when the second action is received, the first device and the second device as belonging to the coordinated operation group.

According to the device classification method pertaining to the above modification, when a user intends to class the first device and the second device as belonging to the coordinated operation group, the user is able to easily classify the first device and the second device to the same coordinated operation group by simply performing actions on only the first device and the second device.

(b) In the device classification method pertaining to one aspect of the present invention, each of the one or more devices in the device group other than the first device may be set to an unclassifiable state when the second action is not received within a predetermined time from setting the one or more devices to the classifiable state.

In this way, if the second action is not performed within the predetermined time from a device being set to the classifiable state, the device that is set to the classifiable state is set to the unclassifiable state.

(c) In the device classification method pertaining to one aspect of the present invention, the devices in the device group may each include a light-emitting element, and the device classification method may further comprise: causing the light-emitting elements of the devices in the device group to emit light in a predetermined pattern while the devices in the device group are set to the classifiable state.

In this way, a user can easily identify a device that is in the classifiable state.

(d) In the device classification method pertaining to one aspect of the present invention, the devices in the device group may each include an action reception device that receives a contact action, and the second action may be received when the action reception device of the second device receives a predetermined contact action while the light-emitting element of the second device is emitting light in the predetermined pattern.

In this way, a user can perform the second action by performing a predetermined action on the action reception device of a device whose light-emitting element is emitting light.

(e) In the device classification method pertaining to one aspect of the present invention, the device classification system may include a storage unit that stores: a first identifier that identifies the first device, a second identifier that identifies the second device, first information that specifies whether or not the first device is classified as belonging to the coordinated operation group, and second information that specifies whether or not the second device is classified as belonging to the coordinated operation group, the first information and the second information respectively attached to the first identifier and the second identifier, and classification of the first device and the second device as belonging to the coordinated operation group may be performed by the storage unit being caused to store the first information in a state that specifies that the first device is classified as belonging to the coordinated operation group, and being caused to store the second information in a state that specifies that the second device is classified as belonging to the coordinated operation group.

In this way, the device classification method implements classification of the first device and the second device to the coordinated operation group, by using the first information and the second information stored by the storage unit.

(f) In the device classification method pertaining to one aspect of the present invention, the first action may be received when the action reception device of the first device receives a predetermined contact action, the action reception device of each of the devices in the device group may also be able to receive an action for determining a position of another device in the device group, relative to the device, at least one of the first action and the second action may include a position determining action for determining positions of the first device and the second device relative to each other, and classification of the first device and the second device as belonging to the coordinated operation group may be performed only when the positions of the first device and the second device relative to each other, determined by the position determining action, are predefined positions of the first device and the second device relative to each other.

In this way, the device classification method determines whether or not the first device and the second device are to be classified as belonging to the coordinated operation group, based on the positions of the first device and the second device relative to each other.

(g) In the device classification method pertaining to one aspect of the present invention, the device classification system may include at least one network connection device that connects to a network by using an IP address, each of the devices in the device group being connected to one of the at least one network connection devices, and may further comprise: repeatedly acquiring an IP address used by a network connection device that connects to a target device in the device group; acquiring, when two IP addresses are acquired by the acquisition of the IP address used by the network connection device that connects to the target device being performed twice and the two IP addresses differ from one another, an IP address used by a network connection device that connects to a device in the device group that is not the target device; and performing a notification of information pertaining to the IP address used by the network connection device that connects to the device in the device group that is not the target device.

In this way, when the IP address used by a network connect on device that connects to a given device is changed, a user is notified pertaining to the IP address used by the network connection device that connects to another device that belongs to the device group.

(h) In the device classification method pertaining to one aspect of the present invention, the devices in the device group may be associated with each other by being positioned in the same house.

In this way, devices that are positioned in the same house are in the device group.

(i) In the device classification method pertaining to one aspect of the present invention, the devices in the device group may be associated with each other by being connected to the same router.

In this way, devices that are connected to the same router are in the device group.

(j) In the device classification method pertaining to one aspect of the present invention, the device group may be composed of three or more devices, and the device classification method may further comprise: receiving a third action performed on a third device in the device group that is set to the classifiable state, for classifying the third device as belonging to the coordinated operation group; setting, when the second action is received and the third action is not received within a predetermined time from the second action being received, each device in the device group that is set to the classifiable state to the unclassifiable state; and classifying, when the second action is received and the third action is received within the predetermined time from the second action being received, the first device, the second device, and the third device as belonging to the coordinated operation group.

In this way, if the third action is not performed within the predetermined time from the second action being performed, a device that is set to the classifiable state is set to the unclassifiable state. Also, if the third action is performed within the predetermined time from the second time being performed, the first device, the second device, and the third device are classified as belonging to the coordinated operation group.

(k) The device classification method pertaining to one aspect of the present invention may further comprise: receiving a coordination action for causing the devices that are classified as belonging to the coordinated operation group to operate in coordination with each other, and controlling the devices that are classified as belonging to the coordinated operation group when the coordination action is received, based on the coordination action.

In this way, a user can cause a plurality of devices that belong to the coordinated operation group to operate in coordination with each other, by performing the coordination action.

(l) A device classification system pertaining to one aspect of the present invention classifies a device in a device group composed of a plurality of devices associated with each other as belonging to a coordinated operation group, devices classified as belonging to the coordinated operation group operating in coordination with each other, the device classification system comprising: a first reception unit that receives a first action performed on a first device in the device group, for classifying the first device as belonging to the coordinated operation group; astute setting unit that, when the first action is received by the first reception unit, sets each of one or more devices in the device group other than the first device to a classifiable state in which the device is classifiable as belonging to the coordinated operation group; a second reception unit that receives a second action performed on a second device in the device group that is set to the classifiable state, for classifying the second device as belonging to the coordinated operation group; and a classification unit that, when the second action is received by the second reception unit, classifies the first device and the second device as belonging to the coordinated operation group.

According to the device classification system pertaining to the above modification, when a user intends to classify the first device and the second device as belonging to the coordinated operation group, the user is able to easily classify the first device and the second device to the same coordinated operation group by simply performing actions on only the first device and the second device.

(m) The device classification system pertaining to one aspect of the present invention may further comprise: a server device that includes a processor and a storage device for storing programs, wherein the server device may communicate with the devices in the device group, and the server device may implement the state setting unit and the classification unit by the processor executing the programs stored in the storage device.

In this way, the state setting unit and the classification unit are implemented by the server device.

(n) A device according to one aspect of the present invention that is subject to classification by an external server device as belonging to a coordinated operation group, devices classified as belonging to the coordinated operation group operating in coordination with each other, the device comprising: a receiving unit that receives a setting signal transmitted from the server device, for setting the device to a classifiable state in which the device is classifiable as belonging to the coordinated operation group; a state setting unit that, when the setting signal is received by the receiving unit, sets the device to the classifiable state; a reception unit that receives a predetermined action performed on the device set to the classifiable state, the predetermined action being for classifying the device as belonging to the coordinated operation group; and a transmission unit that, when the predetermined action is received by the reception unit, transmits an action received signal to the server device that indicates the device has received the predetermined action.

According to the device pertaining to the above modification, when the device has received the setting signal from the server device and receives the predetermined action, the device transmits the action received signal to the server device, indicating that the device has received the predetermined action.

INDUSTRIAL APPLICABILITY

The device specification method, device specification system, and device pertaining to the present invention can be widely used in systems that classify devices.

REFERENCE SIGNS LIST

500 device classification system
510A-510F device A-device F
520A, 520B home gateway A, home gateway B
540 server device
550 network

The invention claimed is:

1. A device classification method of a device classification system, the device classification method comprising:
receiving a first action, performed on a first device in a device group composed of devices associated with each other, for classifying the first device as belonging to a coordinated operation group composed of devices that operate in coordination with each other;
setting, when the first action is received, each of one or more devices in the device group other than the first device to a classifiable state in which the device is classifiable as belonging to the coordinated operation group;
receiving a second action, performed on a second device in the device group that is set to the classifiable state, for classifying the second device as belonging to the coordinated operation group;
acquiring a combination of two or more device types capable of coordinated operation; and
classifying, when the second action is received and a combination of a device type of the first device and a device type of the second device matches the acquired combination of two or more device types, the first device and the second device as belonging to the coordinated operation group, wherein
the classifiable state is a state in which, among the devices in the device group, a light-emitting element of a device registered on a server switches on and off for a predefined period of time, and the second action is a press of a coordination button, which can be received in the classifiable state.

2. The device classification method of claim 1, wherein each of the one or more devices in the device group other than the first device is set to an unclassifiable state when the second action is not received within a predetermined time from setting the one or more devices to the classifiable state.

3. The device classification method of claim 1, wherein the device classification system includes a storage unit that stores: a first identifier that identifies the first device, a second identifier that identifies the second device, first information that specifies whether or not the first device is classified as belonging to the coordinated operation group, and second information that specifies whether or not the second device is classified as belonging to the coordinated operation group, the first information and the second information respectively attached to the first identifier and the second identifier, and
classification of the first device and the second device as belonging to the coordinated operation group is performed by the storage unit being caused to store the first information in a state that specifies that the first device is classified as belonging to the coordinated operation group, and being caused to store the second information in a state that specifies that the second device is classified as belonging to the coordinated operation group.

4. The device classification method of claim 1, wherein the first action is received when a coordination button of the first device is pressed,
the action reception device of each of the devices in the device group is also able to receive an action for determining a position of another device in the device group, relative to the device,
at least one of the first action and the second action includes a position determining action for determining positions of the first device and the second device relative to each other, and
classification of the first device and the second device as belonging to the coordinated operation group is only performed when the positions of the first device and the second device relative to each other, determined by the position determining action, are predefined positions of the first device and the second device relative to each other.

5. The device classification method of claim 1, wherein the device classification system includes at least one network connection device that connects to a network by using an IP address, each of the devices in the device group being connected to one of the at least one network connection devices, further comprising:
repeatedly acquiring an IP address used by a network connection device that connects to a target device in the device group;
acquiring, when two IP addresses are acquired by the acquisition of the IP address used by the network connection device that connects to the target device being performed twice and the two IP addresses differ from one another, an IP address used by a network connection device that connects to a device in the device group that is not the target device; and
performing a notification of information pertaining to the IP address used by the network connection device that connects to the device in the device group that is not the target device.

6. The device classification method of claim 1, wherein the devices in the device group are associated with each other by being positioned in the same house.

7. The device classification method of claim 1, wherein the devices in the device group are associated with each other by being connected to the same router.

8. The device classification method of claim 1 further comprising:
receiving a coordination action for causing the devices that are classified as belonging to the coordinated operation group to operate in coordination with each other, and
controlling the devices that are classified as belonging to the coordinated operation group when the coordination action is received, based on the coordination action.

9. The device classification method of claim 1, wherein the device classification system stores two or more commands linked to the combination of two or more device types capable of coordinated operation, and
each command is executable by a device associated with a corresponding device type.

10. The device classification method of claim 1, wherein the device type is specified by a superordinate code that remains if a subordinate serial number is removed from a product number code of the device.

11. The device classification method of claim 2, wherein the device group is composed of three or more devices, further comprising:
receiving a third action performed on a third device in the device group that is set to the classifiable state, for classifying the third device as belonging to the coordinated operation group;
setting, when the second action is received and the third action is not received within a predetermined time from the second action being received, each device in the device group that is set to the classifiable state to the unclassifiable state; and
classifying, when the second action is received and the third action is received within the predetermined time from the second action being received, the first device, the second device, and the third device as belonging to the coordinated operation group.

12. An electric apparatus classification system comprising:
a microprocessor, and a memory having stored thereon instructions for instructing the microprocessor to cause the electric apparatus classification system to:
receive a first action, performed on a first electric apparatus in an electric apparatus group composed of electric apparatuses associated with each other, for classifying the first electric apparatus as belonging to a coordinated operation group composed of electric apparatuses that operate in coordination with each other;
when the first action is received, set each of one or more electric apparatuses in the electric apparatus group other than the first electric apparatus to a classifiable state in which the electric apparatus is classifiable as belonging to the coordinated operation group;
receive a second action, performed on a second electric apparatus in the electric apparatus group that is set to the classifiable state, for classifying the second electric apparatus as belonging to the coordinated operation group;
acquire a combination of two or more electric apparatus types capable of coordinated operation; and
when the second action is received and a combination of an electric apparatus type of the first electric apparatus and an electric apparatus type of the second electric apparatus matches the acquired combination of two or more electric apparatus types, classify the first electric apparatus and the second electric apparatus as belonging to the coordinated operation group, wherein
the classifiable state is a state in which, among the electric apparatuses in the electric apparatus group, a light-emitting element of an electric apparatus registered on a server switches on and off for a predetermined period of time, and the second action is a press of the coordination button, which can be received in the classifiable state.

13. The electric apparatus classification system of claim 12, wherein
the electric apparatus classification system stores two or more commands linked to the combination of two or more apparatus types capable of coordinated operation, and
each command is executable by an electric apparatus associated with a corresponding apparatus type.

14. An electric apparatus classification system comprising:
a server device that includes a processor and a memory for storing programs, wherein
a combination of two or more electric apparatus types capable of coordinated operation is stored on the server apparatus,
the server device communicates with electric apparatuses
a microprocessor, and a memory having stored thereon instructions for instructing the microprocessor to cause the electric apparatus classification system to:
receive a first action, performed on a first electric apparatus in an electric apparatus group composed of electric apparatuses associated with each other, for classifying the first electric apparatus as belonging to a coordinated operation group composed of electric apparatuses that operate in coordination with each other;
wherein when the first action is received, the server apparatus sets each of one or more electric apparatuses in the electric apparatus group other than the first electric apparatus to a classifiable state in which the electric apparatus is classifiable as belonging to the coordinated operation group;

receive a second action performed on a second electric apparatus in the electric apparatus group that is set to the classifiable state, for classifying the second electric apparatus as belonging to the coordinated operation group;

acquire a combination of two or more electric apparatus types capable of coordinated operation; and wherein when the second action is received and a combination of an electric apparatus type of the first electric apparatus and an electric apparatus type of the second apparatus matches the acquired combination of two or more electric apparatus types, the server apparatus classifies the first electric apparatus and the second electric apparatus as belonging to the coordinated operation group, and the classifiable state is a state in which, among the electric apparatuses in the electric apparatus group, a light-emitting element of an electric apparatus registered on a server switches on and off for a predetermined period of time, and the second action is a press of the coordination button, which can be received in the classifiable state.

15. An electric apparatus comprising:

a microprocessor, and a memory having stored thereon instructions for instructing the microprocessor to cause the electric apparatus classification system to:

receive a setting signal transmitted from a server device, for setting the electric apparatus to a classifiable state in which the electric apparatus is classifiable as belonging to a coordinated operation group composed of electric apparatuses that operate in coordination with each other;

when the setting signal is received, set the electric apparatus to the classifiable state;

receive a predetermined action performed on the electric apparatus set to the classifiable state, the predetermined action being for classifying the electric apparatus as belonging to the coordinated operation group;

acquire a combination of two or more device types capable of coordinated operation; and when the predetermined action is received and a combination of a device type of the first device and a device type of the second device matches the acquired combination of two or more device types, transmit an action received signal to the server device that indicates the electric apparatus has received the predetermined action, wherein the classifiable state is a state in which, among electric apparatuses in an electric apparatus group, a light-emitting element of an electric apparatus registered on a server switches on and off for a predetermined period of time, and the predetermined action is a press of a coordination button.

16. The electric apparatus of claim 15, wherein the server device stores two or more commands linked to the combination of two or more apparatus types capable of coordinated operation, and the electric apparatus executes a command linked to the apparatus type of the electric apparatus.

* * * * *